United States Patent [19]
Saeki et al.

[11] Patent Number: 5,781,000
[45] Date of Patent: Jul. 14, 1998

[54] POWER CONTROL UNIT LOADING TEST METHOD

[75] Inventors: Mitsuo Saeki; Kouichi Matsuda; Hidetoshi Yano; Hidekiyo Ozawa, all of Kawasaki, Japan

[73] Assignee: Fujitsu Limited, Kawasaki, Japan

[21] Appl. No.: 664,497

[22] Filed: Jun. 17, 1996

[30] Foreign Application Priority Data

Jun. 16, 1995 [JP] Japan ................................ 7-150495

[51] Int. Cl.$^6$ ............................... G05F 1/10; G05F 1/40
[52] U.S. Cl. ............................................ 323/234; 323/283
[58] Field of Search ................................ 323/234, 283, 323/281, 267, 285

[56] References Cited

U.S. PATENT DOCUMENTS 4,053,946  10/1977  Opittek et al. ........................ 364/200
5,084,666  1/1992  Bolash ................................... 323/283

FOREIGN PATENT DOCUMENTS

| 55-31129 | 2/1980 | Japan . |
| 1-157117 | 6/1989 | Japan . |
| 3-159267 | 7/1991 | Japan . |

*Primary Examiner*—Matthew V. Nguyen
*Assistant Examiner*—Rajnikant B. Patel
*Attorney, Agent, or Firm*—Staas & Halsey

[57] ABSTRACT

In a power control unit according to the present invention, an output voltage of a power circuit is detected as a control voltage by an output voltage detector and a selector selects one of an internal reference voltage supplied from a built-in reference voltage source and an external reference voltage applied from the external as a selected reference voltage. Further, a control signal generating unit generates a control signal for adjusting the output voltage of said power circuit to voltage corresponding to the selected reference voltage on the basis of the comparison result of said selected reference voltage and said control voltage.

23 Claims, 13 Drawing Sheets

POWER CONTROL UNIT LOADING TEST METHOD

BACKGROUND OF THE INVENTION

The present invention relates to a power control unit adjusting the output voltage of a power circuit to a voltage corresponding to a reference voltage, and relates to a loading test method for testing operations of loading connected to the power circuit by making use of the power control unit.

A power circuit, generally incorporated in electronic equipment such as a note-type personal computer to supply an operating voltage to each part (which will be referred to hereinafter to as a load) of the electronic equipment, is equipped with a control section (power control unit) to maintain an output voltage of the power circuit (the operating voltage of the load) at a constant value. For example, a DC-DC converter serving as one of power circuits generally has an arrangement as shown in FIG. 12. This DC-DC converter is composed of a transistor Tr1, a choke coil L1, a flywheel diode D2, a diode D1, a smoothing capacitor C1, resistors R1, R2 and a control section 60a. An input terminal of the transistor Tr1 accepts an input voltage Vi, while a control terminal thereof is coupled to an output terminal of the control section 60a to turn transistor Tr1 on and off by the control section 60a. Further, an output terminal of the transistor Tr1 comes into connection with one terminal of the choke coil L1. The flywheel diode D2 is placed between the one terminal of the choke coil L1 and the ground, and the anode of the diode D1 is in connection with the other terminal of the chose coil L1, while the cathode of the diode D1 is in coupling relation to an output terminal of the DC-DC converter. In addition, the smoothing capacitor C1 is situated between the cathode of the diode D1 and the ground, and a series circuit comprising the resistors R1 and R2 is provided between the output terminal of the DC-DC converter and the ground. This series circuit constitutes a detecting circuit for an output voltage Vo.

The control section 60a, in addition to the aforesaid output terminal, further comprises an input terminal responsive for an input voltage Vi to the DC-DC converter. Whereupon, the control section 60a accepts the input voltage Vi as an operating voltage. Moreover, the control section 60a has an input terminal (which will be referred hereinafter to as a terminal SC) to receive from the external an ON/OFF signal which acts as a constant-control instruction for the output voltage Vo. In addition, the control section 60a is provided with an input terminal (which will be referred hereinafter to as a terminal FB) for the output voltage Vo. This terminal FB is connected with a junction between the resistors R1 and R2, with the result that the detection value of the output voltage Vo appearing across the resistor R2 is inputted as a control voltage ERR to the control section 60a.

The DC-DC converter thus arranged roughly operates as follows. That is, in response to the ON operation (actuated state) of the transistor Tr1, the choke coil L1 accumulates power, while in response to the OFF operation of the transistor Tr1, the flywheel diode D2 releases the accumulated power in the choke coil L1. Further, the output voltage Vo predetermined to a given value is transformed and outputted to the output terminal of the DC-DC converter. The resistors R1 and R2 detects the output voltage Vo at any time while supplying the detected voltage as the control voltage ERR to the control section 60a. On the basis of the control voltage ERR, the control section 60a ON/OFF-controls the transistor Tr1 to keep the output voltage Vo at a given constant value.

Accordingly, the control section 60a is arranged as shown in FIG. 13. The control section 60a is based on an LSI (Large Scale Integration) circuit and is equipped with a built-in reference voltage source 66, an error amplifier 61, a PWM (Pulse-Width Modulation) comparator 62, a power supply 63, a triangular-wave oscillator 64 and a drive circuit 65. The power supply 63 is coupled to the input terminal for the input voltage Vi and further to the terminal SC. The and the power supply makes an operating power for each part of the control section 60a out of the input voltage Vi. Further, when the ON/OFF signal from the external assumes the ON state, the power supply 63 supplies the operating power to each part of the control section 60a. The error amplifier 61 takes the control voltage ERR through its negative-phase input terminal and further accepts a reference voltage e1 through its positive-phase input terminal. The error amplifier 61 detects and amplifies the difference between the control voltage ERR and the reference voltage e1 and outputs the resultant.

The positive-phase input terminal of the PWM comparator 62 is in connection with the output terminal of the error amplifier 61, while the negative-phase input terminal thereof takes a coupled relation to the triangular-wave oscillator 64. In this instance, the triangular-wave oscillator 64 is for generating a triangular-wave signal for conversion of a voltage into a pulse width at a constant frequency. In addition, when receiving the difference-amplification result as an output signal through its positive-phase input terminal and accepting the triangular-wave signal through its negative-phase input terminal, the PWM comparator 62 generates a PWM signal with a pulse width and a pulse spacing corresponding to the difference therebetween. One terminal of the drive circuit 65 is connected with the PWM comparator 62, while the other terminal thereof is coupled to the control terminal of the control section extending to the control terminal of the transistor Tr1. Whereupon, the drive circuit 65 controls the ON/OFF status of the transistor Tr1 on the basis of the PWM signal inputted from the PWM comparator 62.

Under the condition that the input voltage Vi is applied as the operating voltage and the ON signal being a constant-control instruction for the output voltage Vo is inputted into the terminal SC, the control section 60a operates as follows. That is, the control voltage ERR, inputted through the terminal FB into the control section 60a, enters the error amplifier 61. Simultaneously, the error amplifier 61 further accepts the reference voltage e1 from the built-in reference voltage source 66. At this time, the error amplifier 61 detects and amplifies the difference between the control voltage ERR and the reference voltage e1 to input the resultant as an output signal to the PWM comparator 62. In addition, the triangular-wave oscillator 64 applies a triangular-wave signal to the PWM comparator 62. The PWM comparator 62 makes a comparison between the output signal of the error amplifier 61 and the triangular-wave signal. If the output signal of the error amplifier 61 exceeds the output signal of the triangular-wave oscillator 64, the PWM comparator 62 generates a PWM signal whereby the transistor Tr1 is held in its ON status for a given period of time, and supplies the same PWM signal to the drive circuit 65. Further, the drive circuit 65 gives the PWM signal, inputted from the PWM comparator 62, to the transistor Tr1. Accordingly, the transistor Tr1 comes into the ON status for the given period of time, whereas the output terminal side of the transistor Tr1 receives a voltage whereby the output voltage Vo is constantly maintained at a given value. With such an operations repeated, the DC-DC converter outputs the output voltage Vo with a given constant value from its output terminal.

In cases where a power circuit such as the aforesaid DC-DC converter is mounted in an electronic equipment and is actually put in practical use, the components of the power circuit varies in characteristic due to the temperature variations in the vicinity of the electronic equipment, with the result that the output voltage of the power circuit can vary. For this reason, in general an electronic equipment is manufactured taking into consideration a voltage range (which will be referred hereinafter to as a margin) where a load is normally operable even if the output voltage of the power circuit varies from a predetermined value. Moreover, prior to an electric equipment being put on the market, a loading test (which will be referred hereinafter to as a margin test) is commonly made to check whether or not when the output voltage of the power circuit incorporated in that electronic equipment varies, the load of the electronic equipment takes a normal action within the margin.

For carrying out this margin test on an electronic equipment incorporating the DC-DC converter as shown in FIGS. 12 and 13, the FIG. 12 DC-DC converter arrangement is altered as shown in FIG. 14. More specifically, the resistor R2 of FIG. 12 is replaced with a variable resistor R3 as shown in FIG. 14 so that the output voltage Vo, i.e., the control voltage ERR, detected by the resistor R1 and the resistor R3 becomes variable. Appropriately changing the value of the control voltage ERR enables a test on the operating state of the load. In the electronic equipment passing through this margin test, the variable resistor R3 of the DC-DC converter is again replaced with the resistor R2, before being put on the market. However, since each electric equipment undergoes this margin test, the replacements between the resistors R2 and R3 in the DC-DC converter are required for every electric equipment. This results in a large number of added processes concurrent with the adjustments of the variable resistor R3.

In addition, in accompany of the recent tendency that the load of the electronic equipment involves an IC (Integrated Circuit) or an LSI (for example, CPU (Central Processing Unit) or the like), the load has been made to operate on a lower operating voltage. For this reason, the load margin decreases, besides the yield of the load deteriorates.

On the other hand, a power circuit of the electronic equipment is required to supply a high-accuracy output voltage to the load because of the decrease in the load margin. In order to meed this requirement, the power control unit is designed to accommodate as many components of the power circuit as possible to improve the output accuracy and the reliability of the power circuit. For instance, the resistors R1 and R2 of the FIGS. 12 and 13 DC-DC converter as described before are built in a control section 60b as shown in FIGS. 15 and 16.

However, in the case of the DC-DC converter where the resistors R1 and R2 are incorporated in the control section 60b, the replacement of the resistor R2 becomes impossible. Thus, in order for the control voltage ERR being variable for the margin test, for example simultaneously with the removal of a transistor Tr1 in FIG. 15 a variable voltage source is newly required to be coupled to one terminal of a choke coil L1, or in addition to the removal of the choke coil L1 a variable voltage source is needed to be mounted therein. As a result, the margin test becomes extremely troublesome.

Accordingly, the actual margin test is made to only some electronic equipment selected from a multiplicity of electronic equipment which are manufactured at a time and intended for being put on the market. Further, if all the selected electronic equipment pass the margin test, all the multiplicity of electronic equipment which are intended for being put on the market are assumed to pass the margin test and, hence, are actually put on the market.

Since as mentioned above not all the electronic equipment take the margin test, there is a possibility that, in some of the electronic equipment which are put on the market without taking the margin test, their loads do not normally operate within the margin. Now that the margin test is very troublesome as described before, difficulty is experienced to carry out the margin test for all the electronic equipment.

SUMMARY OF THE INVENTION

The present invention has been developed with a view to eliminating the above-described problem, and it is therefore an object of the present invention to provide a power control unit which is capable of easily changing the output voltage of a power circuit without the displacement of components of the power circuit.

Another object of the present invention is to provide a loading test method for testing operations of loading connected to the power circuit by making use of the power control unit.

The present invention employs the following arrangement in order to eliminate the aforesaid problem.

The power control unit of the present invention, comprises an output voltage detecting unit detecting an output voltage of a power circuit as a control voltage, and a built-in reference voltage source for supplying an internal reference voltage. The unit also comprises a selector selecting one of said internal reference voltage supplied from said built-in reference voltage source and an external reference voltage applied from the external to said power control unit as a selected reference voltage to be compared with said control voltage detected by said output voltage detecting unit and a control signal generating unit generating a control signal for adjusting the output voltage of said power circuit to a voltage corresponding to the selected reference voltage on the basis of the comparison result of said selected reference voltage selected by said selector and said control voltage detected by said output voltage detecting unit.

In this instance, the selective operation of the switch can be made manually or automatically.

In addition, according to the present invention, the power control unit comprises a external input detecting unit detecting the presence or absence of the applied external reference voltage, and in this case the switch is made to select one of the internal reference voltage and the external reference voltage on the basis of the detection result by the external input detecting unit.

Furthermore, the power control unit of the present invention, comprises a output voltage detecting unit detecting an output voltage of a power circuit as a control voltage and a built-in reference voltage source for supplying a internal reference voltage. The unit also comprises a digital-to-analog converter for converting a digital data of an external reference voltage inputted from the external into an analog external reference voltage, and a selector for selecting one of said internal reference voltage supplied from said built-in reference voltage source and said external reference voltage converted by said digital-to-analog converter as a selected reference voltage to be compared with said control voltage detected by said output voltage detecting unit and a control signal generating unit generating a control signal for adjusting the output voltage of said power circuit to voltage corresponding to the selected reference voltage on the basis of the comparison result of said selected reference voltage selected by said selector and said control voltage detected by said output voltage detecting unit.

In addition, according to the present invention, the power control unit comprises an external input detecting unit detecting the presence or absence of the applied external reference voltage, and the selector selects one of the internal reference voltage and the external reference voltage on the basis of the detection result by the external input detecting unit.

The external input detecting unit detects the analog external reference voltage converted by the digital-to-analog converter, and the selector selects one of the internal reference voltage and the external reference voltage on the basis of the detection result by the external input detecting unit.

The external input detecting unit detects the digital data of the external reference voltage inputted into the digital-to-analog converter, and the selector selects one of the internal reference voltage and the external reference voltage on the basis of the detection result by the external input detecting unit. In this case, the digital data detected by the external input detecting unit can be serial data or parallel data.

The digital data of the external reference voltage includes data for the selective operation of the selector, and when detecting the selector selective operation data, the selector selects, on the basis of the selector selective operation data, one of the internal reference voltage from the built-in reference voltage source and the external reference voltage converted by the digital-to-analog converter. In this case, the selector has the same function as in the case of the incorporation of the external input detecting means.

The power control unit according to the present invention comprises within a single integrated circuit an output voltage detecting unit detecting an output voltage of the power circuit as a control voltage, a built-in reference voltage source for supplying an internal reference voltage, a selector for selecting one of the internal reference voltage supplied from the built-in reference voltage source and an external reference voltage applied from the external as a selected reference voltage to be compared with the control voltage detected by the output voltage detecting unit, and a control signal generating unit generating a control signal for adjusting the output voltage of the power circuit to voltage corresponding to the selected reference voltage on the basis of the comparison result of the control voltage detected by the output voltage detecting unit and the selected reference voltage selected by the selector.

Besides, the power control unit according to the present invention also can comprise within a single integrated circuit an output voltage detecting unit detecting an output voltage of the power circuit as a control voltage, a built-in reference voltage source for supplying an internal reference voltage, a digital-to-analog convertor for converting a digital data of external reference voltage inputted from the external into an analog external reference voltage, a selector for selecting one of the internal reference voltage supplied from the built-in reference voltage source and the external reference voltage converted by the digital-to-analog convertor as a selected reference voltage to be compared with the control voltage detected by said output voltage detecting unit, and a control signal generating unit generating a control signal for adjusting the output voltage of the power circuit to a voltage corresponding to the selected reference voltage on the basis of the comparison result of the control voltage detected by said output voltage detecting unit and the selected reference voltage selected by the selector.

Hereupon, the integrated circuit can be either IC or LSI. Besides, either a voltage having the same value as that of the selected reference voltage or a voltage obtained by amplifying the selected reference voltage can be substituted for the voltage corresponding to the selected reference voltage.

A loading test method according to the present invention is a loading test method for testing operations on the loading connected to the power circuit by making use of a power control unit provided with an output voltage detecting unit detecting an output voltage of the power circuit as a control voltage, a built-in reference voltage source for supplying an internal reference voltage, a selector for selecting one of the internal reference voltage supplied from the built in reference voltage source and an external reference voltage applied from the external as a selected reference voltage to be compared with the control voltage detected by said output voltage detecting unit, and a control signal generating unit for generating a control signal for adjusting the output voltage of the power circuit to voltage corresponding to the selected reference voltage on the basis of the comparison result of the control voltage detected by said output voltage detecting unit and the selected reference voltage selected by the selector. The loading test method of the present invention comprises the steps of:

applying the external reference voltage to the power control unit from the external, when the operations of the loading are tested; and supplying the loading with the output voltage of the power circuit which has been adjusted to voltage corresponding to the external reference voltage by making the selector select the external reference voltage as the selected reference voltage.

The loading test method according to the present invention is a loading test method for testing operations of the loading connected to the power circuit by making use of a power control unit provided with an output voltage detecting unit detecting an output voltage of the power circuit as a control voltage, a built-in reference voltage source for supplying an internal reference voltage, a digital-to-analog convertor for converting a digital data of an external reference voltage inputted from the external into an analog external reference voltage, a selector for selecting one of the internal reference voltage supplied from the built-in reference voltage source and the external reference voltage converted by the digital-to-analog converter as a selected reference voltage to be compared with the control voltage detected by the output voltage detecting unit, and a control signal generating means for generating a control signal for adjusting the output voltage of the power circuit to voltage corresponding to the selected reference voltage on the basis of the comparison result of the control voltage detected by the output voltage detecting unit and the selected reference voltage selected by the selector. The loading test method of the present invention comprises the steps of:

inputting the digital data of the external reference voltage into the power control unit from the external, when the operations of the loading are tested; and supplying the loading with the output voltage of the power circuit which has been adjusted to the voltage corresponding to the external reference voltage by making the selector select the external reference voltage as the selected reference voltage.

In the loading test method according to the present invention, the power control unit also can be provided with an external input detecting unit for detecting whether or not the external reference voltage is applied thereto so that the selector selects the external reference voltage as the selected reference voltage on the basis of the detection result by the external input detecting unit.

Either the external reference voltage converted by the digital-to-analog convertor or the digital data of the external reference voltage inputted into the digital-to-analog converter also can be detected by the external input detecting unit.

Besides, the digital data of the external reference voltage can include data for a selective operation of the selector so that the selector selects the data for a selective operation of the selector and selects the external reference voltage converted by the digital-to-analog convertor as the selected reference voltage, on the basis of the data for a selective operation of the selector.

In the loading test method of the present invention, the value of the output voltage of the power circuit supplied to the loading can be changed by changing the value of the external reference voltage inputted into the power control unit or the digital data of the external reference voltage.

A power control unit and a loading test method according to the present invention, the power control unit is equipped with the selector whereby the output voltage of the power circuit is easily variable without the displacement of components of the power circuit. This can permits labor saving in the margin test and allows performing the margin test (a loading test) for all the electronic equipment. Moreover, the automatization of the selector selective operation can further promote the labor saving in the margin test. Still further, the external reference voltage is programmable, which is available, for example, in monitoring the battery voltage with a software.

DETAILED DESCRIPTION OF THE INVENTION

A description will be made hereinbelow of embodiments of the present invention with reference to the drawings.

Figure 1:
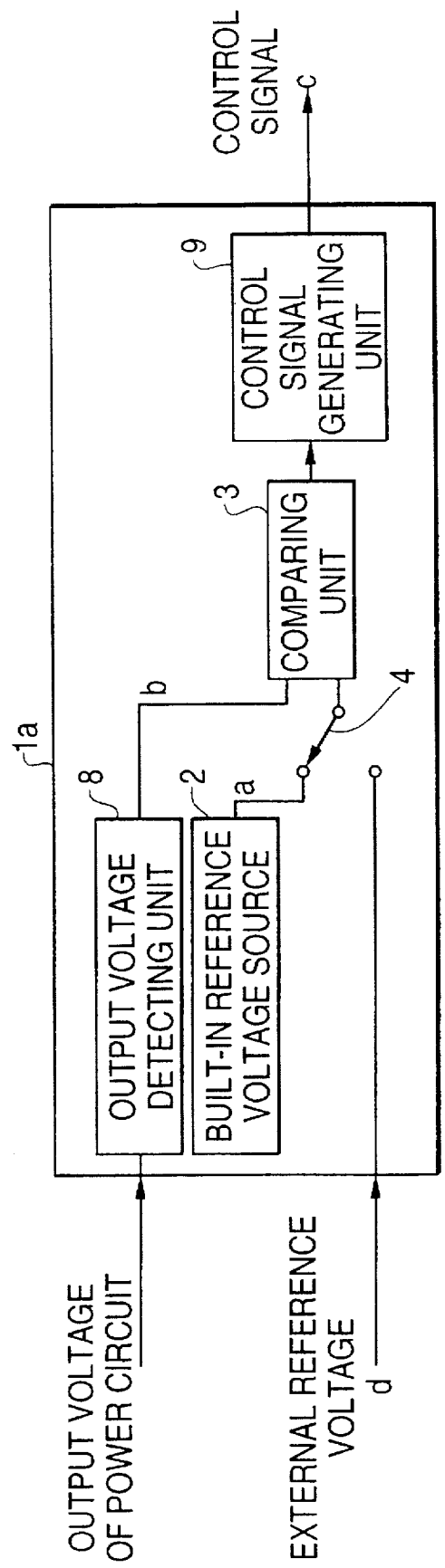
FIG. 1 is a block diagram showing the outline of an embodiment of the present invention.

First of all, embodiments of the present invention will be described hereinbelow with reference to FIGS. 1 to 4. In FIG. 1, a power control unit 1a is provided with an output voltage detecting unit 8, a built-in reference voltage source 2, a comparing unit 3, a selector 4 and a control signal generating unit 9. The output voltage detecting unit 8 accepts an output voltage of a power circuit, not shown. The output voltage detecting unit 8 detects the output voltage inputted therein and supplies it as a control voltage b to the comparing unit 3. The selector 4 selects, as a selected reference voltage to be compared with the control voltage b, one of an internal reference voltage a fed from the built-in reference voltage source 2 and an external reference voltage d applied from the external to the power control unit 1a, and further supplies the selected reference voltage to the comparing unit 3.

When the selector 4 selects the internal reference voltage a, the comparing unit 3 compares the internal reference voltage a with the control voltage b, and gives the comparison result to the control signal generating unit 9. On the basis of the comparison result in the comparing unit 3, the control signal generating unit 9 generates and issues a control signal c for adjusting the output voltage of the power circuit to voltage corresponding to the selected reference voltage. This control signal c demonstrates a function whereby, the output voltage of the power circuit is, for example, controlled to constantly assume a voltage value substantially coincident with the internal reference voltage a.

On the other hand, when the selector 4 selects the external reference voltage d, the comparing unit 3 compares the external reference voltage d with the control voltage b and inputs the comparison result to the control signal generating unit 9. On the basis of the comparison result in the comparing unit 3, the control signal generating unit 9 generates and outputs a control signal c for adjusting the output voltage of the power circuit to voltage corresponding to the selected reference voltage. In accordance with this control signal c, the output voltage of the power circuit is .for example, controlled to constantly constitute a voltage value virtually equal to the external reference voltage d.

Figure 2:
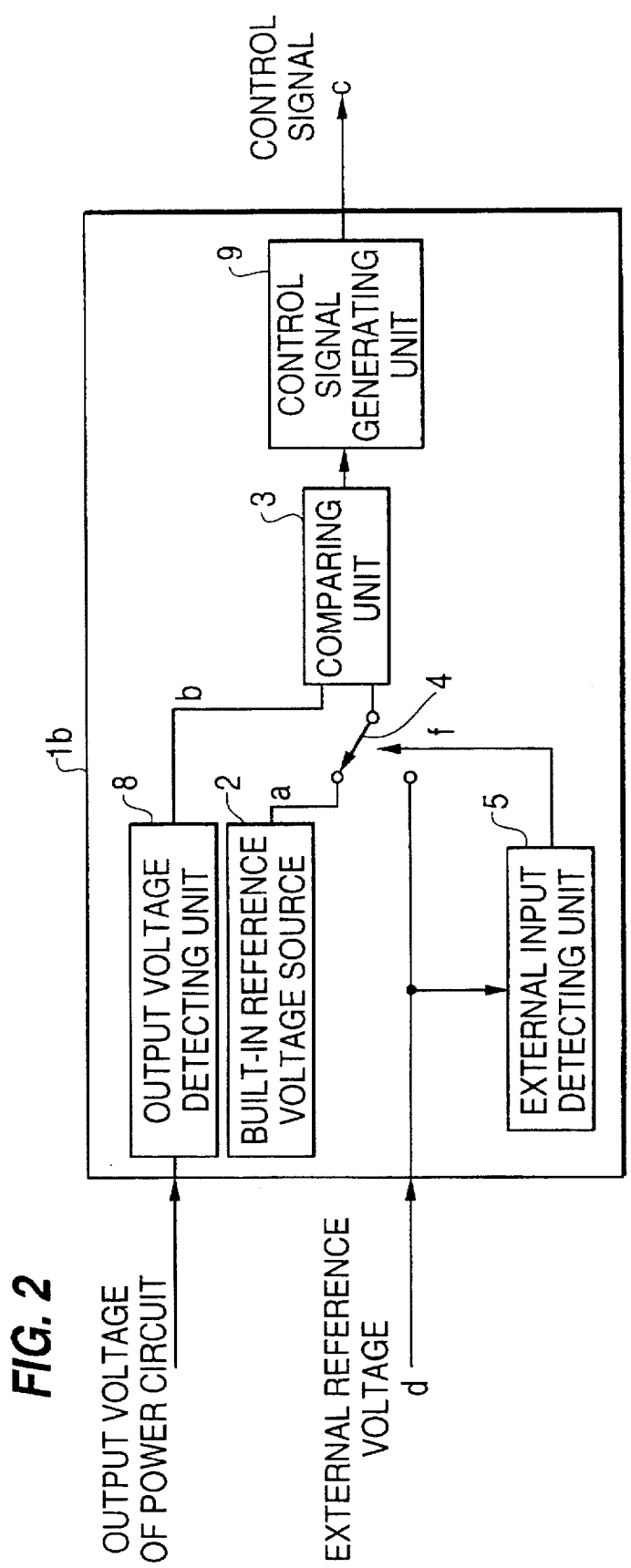
FIG. 2 is a block diagram showing the outline of an embodiment of this invention.

In FIG. 2, a power control unit 1b, in addition to the arrangement of the FIG. 1 power control unit 1a, has an external input detecting unit 5 which detects the presence or absence of the application of the external reference voltage d. According to this power control unit 1b, in response to the application of the external reference voltage d, the external input detecting unit 5 delivers a switching signal f to the selector 4. Whereupon the selector 4 performs its selective operation and supplies the external reference voltage d to the comparing unit 3.

Figure 3:
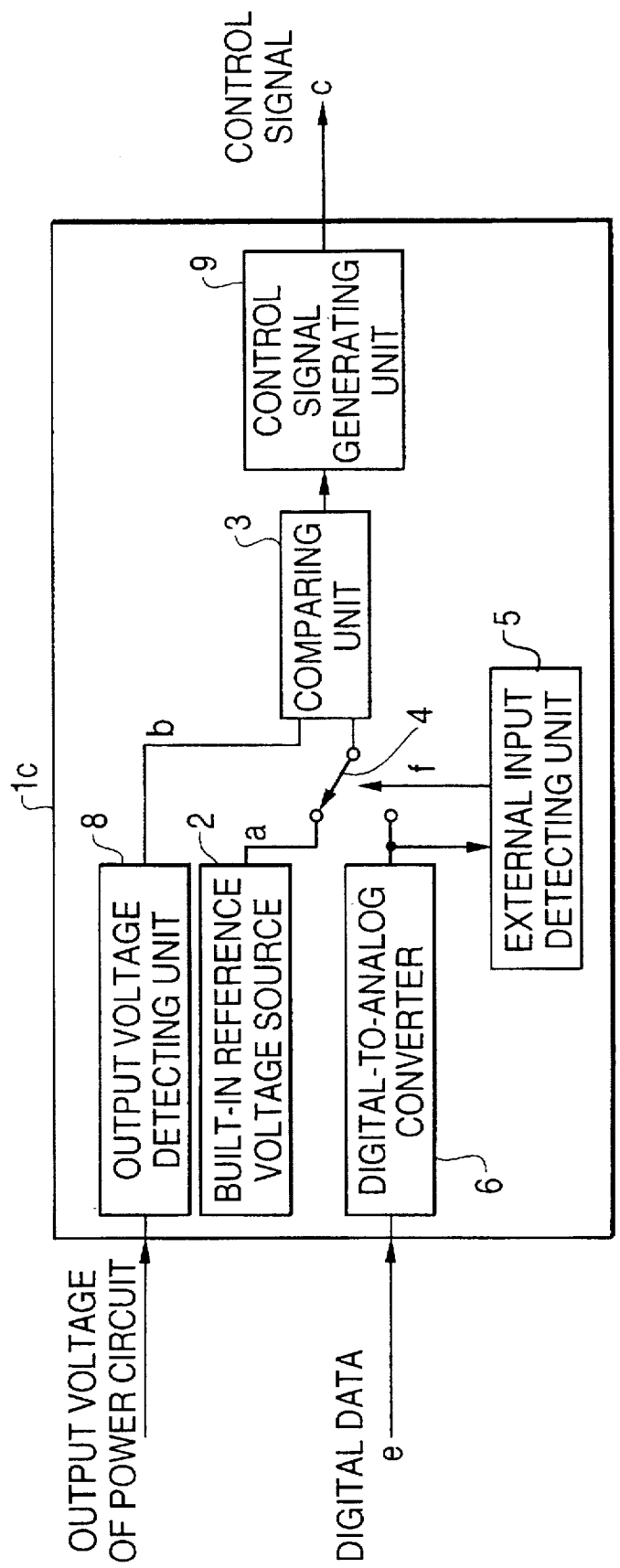
FIG. 3 is a block diagram showing the outline of an embodiment of this invention.

In FIG. 3, because of inputting digital data e of an external reference voltage from the external, in addition to the components of the FIG. 1 power control unit 1a, a power control unit 1c is equipped with a digital-to-analog converter 6 for converting the digital data e of the external reference voltage into an analog external reference voltage d and an external input detecting unit 5 for detecting the external reference voltage d converted by the digital-to-analog converter 6.

According to this power control unit 1c, if the external input detecting unit 5 does not detect the analog external reference voltage d, a selector 4 selects a reference voltage a from a built-in reference voltage source 2. On the other hand, when the digital-to-analog converter 6 outputs the analog external reference voltage d, this external reference voltage d is applied to the external input detecting unit 5 which in turn, issues a switching signal f to the selector 4. Accordingly, the selector 4 implements the selective operation to select the external reference voltage d, this external reference voltage d being inputted in a comparing unit 3.

Figure 4:
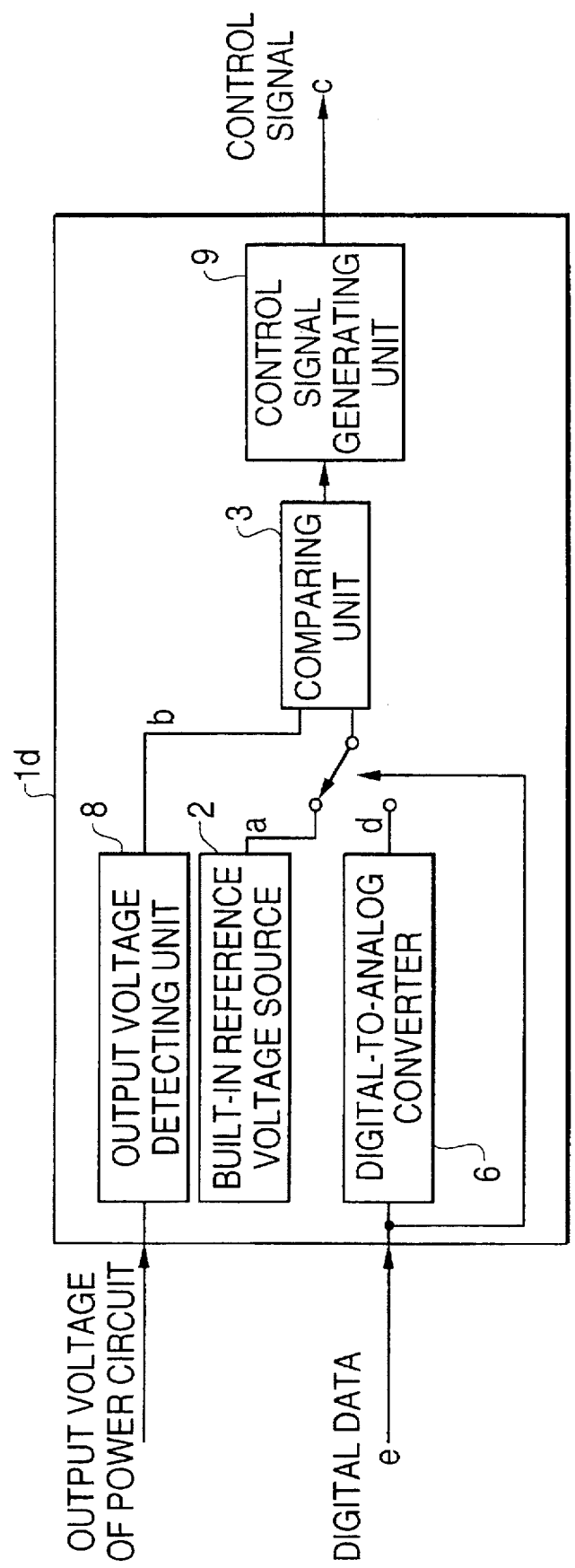
FIG. 4 is a block diagram showing the outline of an embodiment of this invention.

In FIG. 4, under the condition that the digital data e of an external reference voltage to be inputted includes data for a selector 4 selective operation, a power control unit 1d is equipped with a selector 4 which performs the selective operation on the basis of the digital data e of the external reference voltage. In this power control unit 1d, when the digital data e of the external reference voltage is inputted therein from the external, the digital data e enters a digital-to-analog converter 6 and also goes to the selector 4. Whereupon, the selector 4 comes into the selective operation to select an external reference voltage d converted by the digital-to-analog converter 6 and then supplies it to the comparing unit 3.

[First Embodiment]

Figure 5:
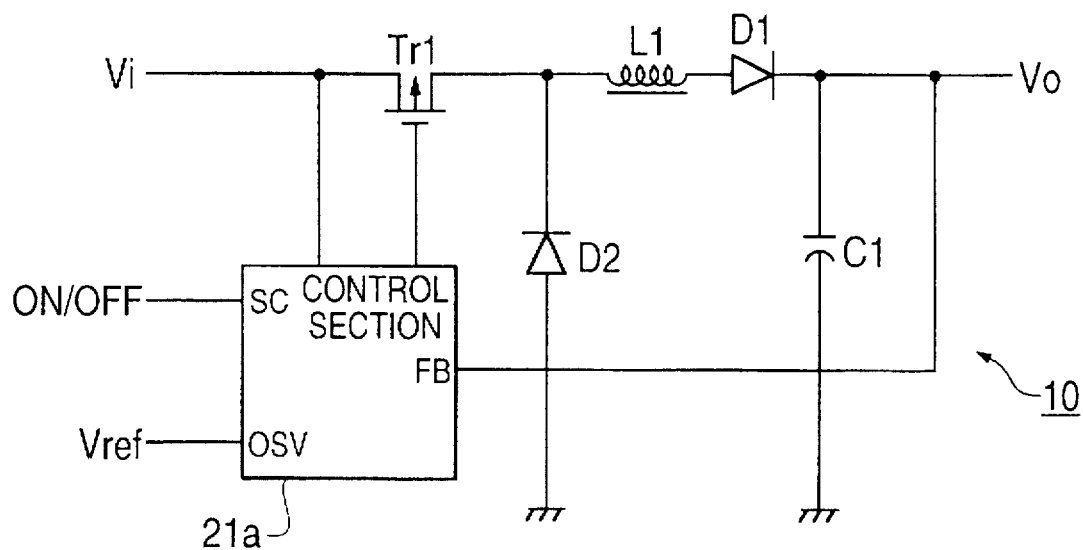
FIG. 5 is an illustration of an entire arrangement of a DC-DC converter using a power control unit according to a first embodiment of the present invention.

Secondly, a description will be made hereinbelow of a first embodiment of the present invention. FIG. 5 shows a DC-DC converter 10 which uses, as a control section 21a, a power control unit according to the first embodiment. This DC-DC converter 10 is equivalent to the power circuit in this invention. The DC-DC converter 10 is equipped with a transistor Tr1, a choke coil L1, a flywheel diode D2, a diode D1, a capacitor C1 and the control section 21a. The transistor Tr1 is constructed with an FET (Field Effect Transistor), and its input terminal is connected to an input terminal of the DC-DC converter, so that an input voltage Vi is applied to the input terminal of the transistor Tr1. In addition, a control terminal of the transistor Tr1 is in connection with an output terminal of the control section 21a. Accordingly, the transistor Tr1 conducts the ON/OFF operations in accordance with an operation of the control section 21a. An output terminal of the transistor Tr1 is coupled to one terminal of the choke coil L1.

This choke coil L1 accumulates power supplied when the transistor Tr1 is in the ON status. The flywheel diode D2 is located between the one terminal of the choke coil L1 and the ground. This flywheel diode D2 releases the power accumulated in the choke coil L1 when the transistor Tr1 is in the OFF status. The other terminal of the choke coil L1 extends to the anode of the diode D1. On the other hand, the cathode of the diode D1 extends to an output terminal of the DC-DC converter 10. This diode D1 is for checking the reverse current from a load (not shown) connected to the output terminal of the DC-DC converter 10. Between the cathode of the diode D1 and the ground there is situated the capacitor C1 which is for removing pulsating components from an output voltage Vo. Through this capacitor C1 a smoothed voltage is outputted as the output voltage Vo from the output terminal of the DC-DC converter 10.

The control section 21a, in addition to the aforesaid output terminal, has an input terminal for an input voltage Vi to the DC-DC converter 10, so that the input voltage Vi is applied as an operating voltage onto the control section 21a. Further, the control section 21a has an input terminal (which will be referred hereinafter to as a terminal SC) for receiving from the external an ON/OFF signal which serves as a constant-control instruction for the output voltage Vo. In addition, the control section 21a retains an input terminal (which will be referred hereinafter to as a terminal FB) for the output voltage Vo. This terminal FB is put between the diode D1 and the output terminal of the DC-DC converter 10. Whereupon, the control section 21a accepts the output voltage Vo of the DC-DC converter 10. Moreover, the control section 21a retains a input terminal (which will be referred hereinafter to as a terminal OSV) for inputting an external reference voltage Vref coming from an external reference voltage source, not shown.

Furthermore, referring to FIG. 6 a description will be taken hereinbelow of an internal arrangement of the control section 21a. The control section 21a is constructed with only LSI and is equipped with an built-in reference voltage source 66, an error amplifier 61, a PWM comparator 62, a power supply 63, a triangular-wave oscillator 64, a drive circuit 65, resistors R1, R2 and R4, a switch (selector)22, a comparator 23 and a comparing voltage source 30. The power supply 63 is connected to the input terminal for the input voltage Vi and further to the terminal SC. This power supply 63 generates an operating voltage for each part of the control section 21a on the basis of the input voltage Vi. In addition, the power supply 63 gives the operating voltage to each part of the control section 21a when the ON/OFF signal inputted from the external is in the ON status, while stopping the supply of the operating voltage when the ON/OFF signal from the external shows the OFF status. Accordingly, the ON/OFF control of the transistor Tr1 by the control section 21a is implemented when the ON/OFF signal inputted in the power supply 63 is in the ON status.

The triangular-wave oscillator 64 outputs a triangular-wave signal with a constant frequency which is used for converting a voltage into a pulse width.

One terminal of the resistor R1 is connected to the terminal FB, whereas the other terminal of the resistor R1 is coupled to one terminal of the resistor R2, the other terminal of which is grounded. Accordingly, the output voltage Vo is detectable as a control voltage ERR at the junction between the resistors R1 and R2. These resistors R1 and R2 is equivalent to the output voltage detecting unit in this invention.

The error amplifier 61 is constructed with an operational amplifier. A negative-phase input terminal of the error amplifier 61 is connected to the junction between the resistors R1 and R2, while a positive-phase input terminal thereof is connected to an output terminal α of the switch 22. The switch 22, in addition to the output terminal α, has switching input terminals β and γ. The switching input terminal β is in connection with the built-in reference voltage source 66, whereas the switching input terminal γ is coupled through a signal line to the terminal OSV. With this arrangement, the switch 22 selects one of an internal reference voltage e1 supplied from the built-in reference voltage source 66 and an external reference voltage Vref supplied through the terminal OSV from an external reference voltage source (not shown) as a selected reference voltage, and delivers the selected one to the error amplifier 61. Accordingly, the error amplifier 61 receives the internal reference voltage e1 or the external reference voltage Vref through its negative-phase input terminal and accepts the control voltage ERR through its positive-phase input terminal. Further, the error amplifier 61 detects and amplifies a difference between the internal reference voltage e1 or the external reference voltage Vref and the control voltage ERR. This error amplifier 61 is equivalent to the comparing unit in this invention.

The PWM comparator 62 has a positive-phase input terminal and a negative-phase input terminal and serves as a voltage pulse width converter which compares a signal inputted through the positive-phase input terminal with a signal inputted through the negative-phase input terminal and determines the ON time period of an output pulse in accordance with the difference between the two input signals. In other words, the PWM comparator 62 generates a signal (PWM signal) having a pulse width and a pulse spacing corresponding to the magnitude of the output signal of the error amplifier 61. This PWM comparator 62 is equivalent to the control signal generating unit in this invention.

The positive-phase input terminal of the PWM comparator 62 is coupled to the output terminal of the error amplifier 61, while the negative-phase input terminal thereof is connected to the triangular-wave oscillator 64. Accordingly, the detection and amplification result of the error amplifier 61 is inputted as an output signal to the PWM comparator 62 through its positive-phase input terminal, whereas a triangular-wave signal is inputted therein through its negative-phase input terminal. In this instance, the PWM comparator 62 outputs a PWM signal with a high level while the triangular-wave signal inputted from the triangular-wave oscillator 64 is higher than the output signal of the error amplifier 61. On the other hand, the PWM comparator 62 outputs a PWM signal with a low level while the triangular-wave signal inputted from the triangular-wave oscillator 64 is lower than the output signal of the error amplifier 61.

One terminal of the drive circuit 65 is in connected relation to the PWM comparator 62, whereas the other terminal thereof is in connected relation to a control terminal coupled to the control terminal of the transistor Tr1. Thus, the drive circuit 65 ON/OFF-controls the transistor Tr1 on the basis of the PWM signal inputted from the PWM comparator 62. More specifically, the drive circuit 65 makes the transistor Tr1 take the ON status for a given time period when the HIGH-level PWM signal is inputted into the drive circuit 65. On the other hand, the drive circuit 65 ceases its operation when the LOW-level PWM signal is introduced thereinto.

The switch 22 starts its selective operation in response to the output signal of the comparator 23. The positive-phase input terminal of the comparator 23 is connected to a signal line for establishing the connection between the switching input terminal γ and the terminal OSV, whereas the negative-phase input terminal of the comparator 23 is in connection with the comparing voltage source 30. This comparator 23 compares the external reference voltage Vref with a comparing voltage e2 to supply a HIGH signal to the switch 22 when the external reference voltage Vref exceeds the comparing voltage e2 while supplying a LOW signal thereto when the external reference voltage Vref is lower than the comparing voltage e2. The value of this comparing voltage e2 is set to be smaller than the value of the external reference voltage Vref to be applied. For this reason, when the external reference voltage Vref is applied onto the control section 21a, the comparator 23 outputs the HIGH signal. Further, in response to the HIGH signal given, the switch 22 selects the switching input terminal γ, while in response to the LOW signal, it selects the switching input terminal β. This comparator 23 is equivalent to the external input detecting unit in this invention. Moreover, one terminal of the resistor R4 is connected to a signal line for establishing the connection between the terminal OSV and the switching input terminal γ of the switch 22, while the other terminal thereof comes to the ground. Thus, when the external reference voltage Vref is not given from an external reference voltage (not shown), the potential of the signal line between the terminal OSV and the switching input terminal γ of the switch 22 falls to the ground level.

The DC-DC converter 10 thus arranged is mounted on an electronic equipment such as a note-type personal computer (not shown) to be used as a power circuit for a load (not shown) of the electronic equipment. Examples of using the DC-DC converter mounted on the electronic equipment will be described hereinbelow about the two cases: commonly using the electronic equipment and conducting the aforesaid margin test.

(1) Common Use of Electronic Equipment Let it be assumed that the operator applies the input voltage Vi to the input terminal of the FIG. 5 DC-DC converter and further inputs the ON signal through the terminal SC to the control section 21a. In this case, the operator does not apply the external reference voltage Vref to the control section 21a.

The power supply 63 of the control section 21a receives power and accepts an ON signal to supply power to each part of the control section 21a in accordance with the ON signal. Accordingly, the triangular-wave oscillator 64 generates a triangular-wave signal and the comparing voltage source 30 inputs a comparing voltage e2 to the comparator 23. On the other hand, because of no application of the external reference voltage Vref as mentioned above, the ground voltage is inputted in the comparator 23. The comparator 23 compares the comparing voltage e2 with the ground voltage and gives the LOW signal to the switch 22 because the comparing voltage e2 is higher than the ground voltage.

In response to the LOW signal from the comparator 23, the switch 22 selects the switching input terminal β, with the result that the internal reference voltage e1 is inputted from the built-in reference voltage source 66 to the error amplifier 61. The error amplifier 61 further receives the control voltage ERR detected by the resistors R1 and R2. However, since at this time the transistor Tr1 does not yet get into the ON status after the application of the input voltage Vi, the output of the output voltage Vo does not take place. In this case, zero voltage is inputted as the control voltage ERR to the error amplifier 61. The error amplifier 61 compares the internal reference voltage e1 with the control voltage ERR and detects and amplifies the difference therebetween to supply the resultant as the output signal to the PWM comparator 62. In addition, a triangular-wave signal is inputted from the triangular-wave oscillator 64 to the PWM comparator 62.

The PWM comparator 62 compares the triangular-wave signal with the output signal of the error amplifier 61. In the case that the value of the control voltage ERR is zero, since the triangular-wave signal becomes higher than the output signal of the error amplifier 61, the HIGH-level PWM signal is inputted in the drive circuit 65. The drive circuit 65 delivers the HIGH-level PWM signal to the control terminal of the transistor Tr1 of FIG. 5. Accordingly, the transistor Tr1 turns into the ON status for a given time period. In consequence, a voltage is applied to the output terminal side of the transistor Tr1 and power is accumulated in the choke coil L1. When the transistor Tr1 turns into the OFF status, the flywheel diode D2 releases the power accumulated in the choke coil L1. Thus, the output voltage Vo on the basis of a value of the internal reference voltage e1 goes to the output terminal of the DC-DC converter 10.

This output voltage Vo is inputted through the terminal FB to the control section 21a at any time and detected as the control voltage ERR by the resistors R1 and R2 of FIG. 5. This control voltage ERR is inputted through the switch 22 to the error amplifier 61. Further, the error amplifier 61 supplies the PWM comparator 62 with the detection and amplification result of the difference between the control voltage ERR and the internal reference voltage e1. The PWM comparator 62 compares the triangular-wave signal with the output signal of the error amplifier 61 to generate a HIGH-level or LOW-level PWM signal to supply it to the drive circuit 65. Further, the drive circuit 65 makes the transistor Tr1 turn into the ON state in response to every input of the HIGH-lever PWM signal. This operation is repeatedly carried out.

The control section 21a monitors the output voltage Vo, and when the output voltage Vo becomes smaller than the value on the basis of the internal reference voltage e1, it makes the transistor Tr1 turn ON for a given period of time so that the output voltage Vo becomes on the basis of the internal reference voltage e1.

Accordingly, the output voltage Vo is constantly delivered to the output terminal of the DC-DC converter 10. Namely, an output voltage Vo which has been adjusted to voltage corresponding to an internal reference voltae e1 is supplied to the loading as an operating voltage and the load is operated normally.

(2) Implementation of Margin Test

For performing the margin test, let it be assumed that the operator applies the input voltage Vi to the input terminal of the FIG. 5 DC-DC converter 10 and the control section 21a receives the ON signal through the terminal SC. In addition, an external reference voltage Vref for the margin test is exerted thereon through the terminal OSV.

Under these conditions, as described before the power supply 63 supplies the power to each part of the control section 21a in accordance with the ON signal, and the triangular-wave oscillator 64 supplies a triangular-wave signal to the PWM comparator 62. In addition, the comparing voltage source 30 provides a comparing voltage e2 to the comparator 23. Moreover, the comparator 23 receives the external reference voltage Vref through the terminal OSV. Thus, the comparator 23 compares the comparing voltage e2 with the external reference voltage Vref, and gives the HIGH signal to the switch 22 because the external reference voltage Vref is higher than the comparing voltage e2. Responding to the input of the HIGH signal, the switch 22 selects the switching input terminal γ, with the result that the external reference voltage Vref is inputted in the error amplifier 61. The following operations are the same as those in the case of commonly using the electronic equipment, and hence the description thereof will be omitted for simplicity. Finally, the output voltage Vo on the basis of the external reference voltage Vref is constantly outputted to the output terminal of the DC-DC converter 10 and then supplied to the load.

With this arrangement, the operator can confirm whether or not the load normally works on the basis of this output voltage Vo. In addition, if the operator operates the external reference voltage source (not shown) to appropriately alter the value of the external reference voltage Vref for the margin test and applies it onto the control section 21a, the output voltages Vo with different values can be given to the load. Accordingly, it is possible to check whether or not the load is normally operable within the margin.

If the operator stops the application of the external reference voltage Vref, in place of the external reference voltage Vref the ground voltage is inputted to the comparator 23. The comparator 23 generates the LOW signal and supplies it to the switch 22, with the result that the switch 22 conducts the selective operation to switch from the switching input terminal γ to the switching input terminal β. Whereupon, the selected reference voltage changes from the external reference voltage Vref to the internal reference voltage e1. That is, the electronic equipment can be put on the market.

In the power control unit (control section 21a) according to the first embodiment, the selection of one of the internal reference voltage e1 and the external reference voltage Vref is possible by the switch 22, whereby the value of the output voltage Vo is variable by the switching operation of the switch 22. Accordingly, in the case of supplying the operating voltage from the DC-DC converter to its load, if the switch 22 is made to select the internal reference voltage e1 supplied from the built-In reference voltage source 66, the load can accept the operating voltage with a high accuracy.

On the other hand, in the case of conducting the margin test, if the external reference voltage Vref for the margin test is inputted in the control section 21a, the switch 22 selects the switching input terminal γ, so that the output voltage Vo for the margin test is given to the load. Thus, it is possible to perform the margin test without the replacement of the components of the DC-DC converter 10. As a result, the labor saving, improvement of efficiency and cost reduction are possible in the margin test, and the margin test can be made to all the electronic equipment. Accordingly, it is possible to check whether or not the loads of all the electronic equipment which are intended to be put on the market operate normally within the margin, and hence it is possible to eliminate the troubles or breakdown of the electronic equipment which occur because the loads do not operate normally within the margin.

In addition, the selective operation of the switch 22 is accomplished by using the comparator 23 and on the basis of the presence or absence of the application of the external reference voltage Vref. Whereupon, it is possible to automatically conduct the selective operation of the switch 22 and to readily perform the margin test. Moreover, the arrangement for the automation of the selective operation of the switch 22 becomes simple, for example, by using the comparator 23, and therefore the control section 21a can escape from the increase in size and the complication.

Incidentally, it is also appropriate that the comparator 23, the comparing voltage source 30 and the resistor R4 are removed and instead the selective operation of the switch 22 is accomplished by a manual operation.

[Second Embodiment]

Figure 7:
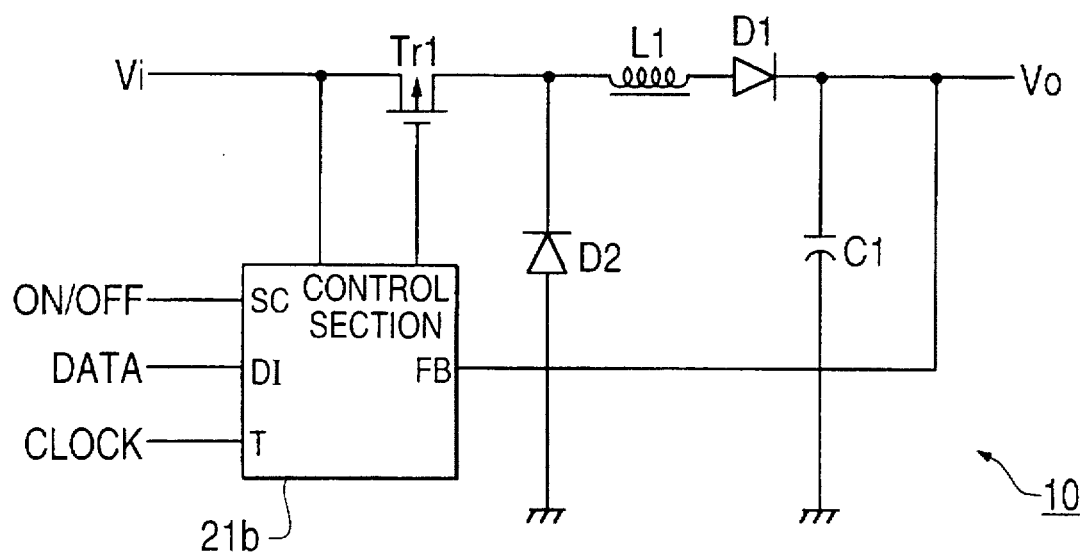
FIG. 7 is an illustration of an entire arrangement of a DC-DC converter using a power control unit according to a second embodiment of the present invention.

Secondly, a description will be made hereinbelow of a second embodiment of this invention. FIG. 7 illustrates a DC-DC converter 10 where a power control unit according the second embodiment is used as a control section 21b. This DC-DC converter 10 corresponds to the power circuit in this invention. This DC-DC converter 10 has the same arrangement as the DC-DC converter according to the first embodiment except the control section 21b. Therefore, the description will be taken about the different points therebetween, but the description of the common parts will be omitted for brevity.

Figure 8:
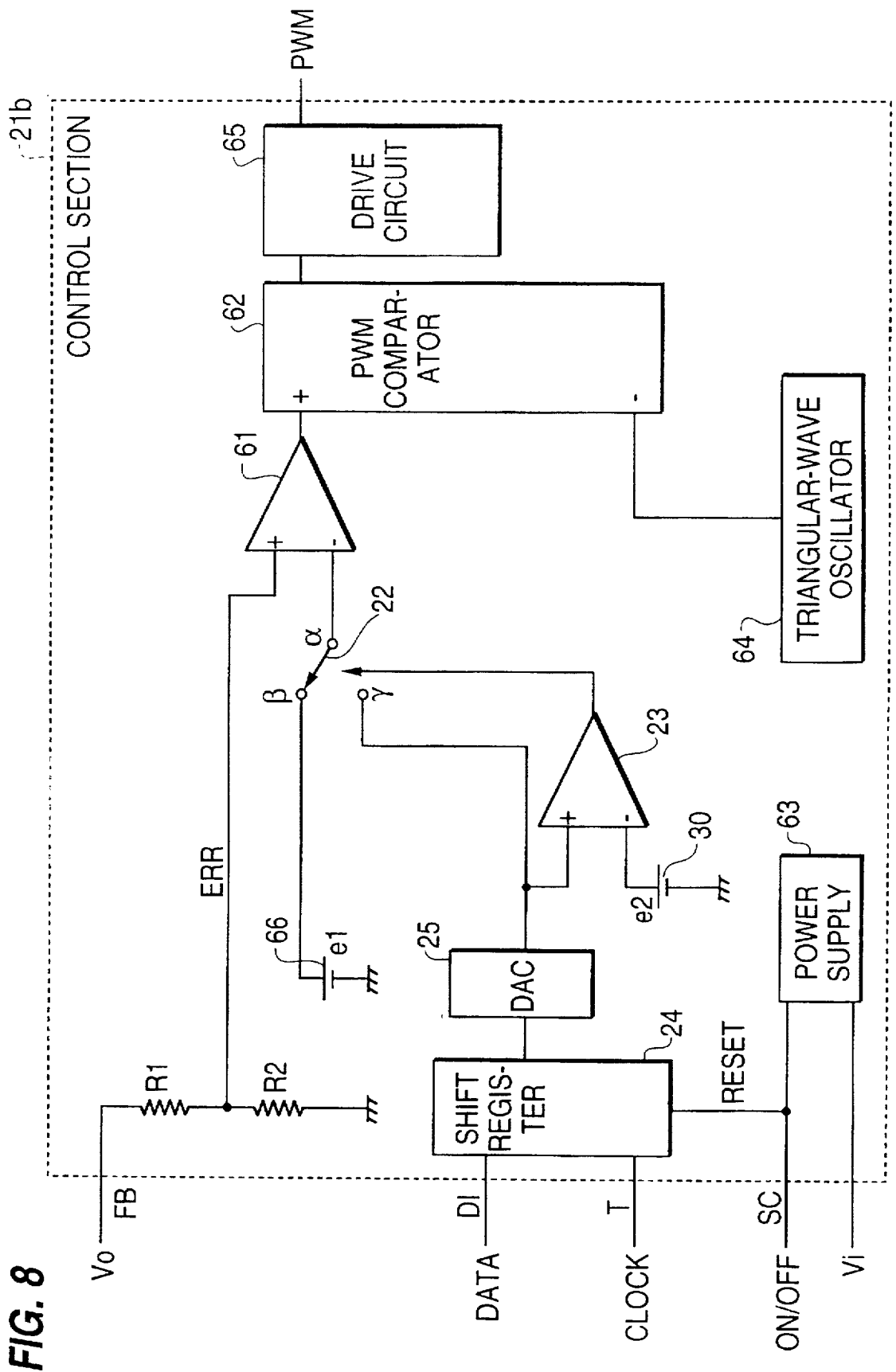
FIG. 8 is an illustration of an internal arrangement of the power control unit as shown in FIG. 7.

In the control section 21b, in place of the terminal OSV in the first embodiment, there are provided an input terminal (which will be referred hereinafter to as a terminal DI) for the digital data of an external reference voltage value and an input terminal (which will be referred hereinafter to as a terminal T) for a clock signal. In the internal arrangement of the control section 21b, in addition to the arrangement of the control section 21a shown in FIG. 6, as shown in FIG. 8 there are provided a shift register 24 and a digital-to-analog converter (which will be referred hereinafter to as a DAC) 25. The terminals DI and T are connected to the shift register 24 to supply the digital data and the clock signal thereto. This shift register 24 is connected to the DAC 25. The shift register 24 takes in the digital data of the external reference voltage value in a bit serial form in accordance with the clock signal inputted through the terminal T and converts that digital data into bit parallel data to supply the bit parallel data to the DAC 25. Further, the shift register 24 is coupled to a signal line for setting up the connection between the terminal SC and a power supply 63, thus receiving an ON/OFF signal through the terminal SC of the control section 21b. Accordingly, the shift register 24 resets its own contents when receiving the OFF signal.

The DAC 25 converts the bit parallel data of the external reference voltage value the shift register 24 outputs into an analog form to obtain an external reference voltage Vref (analog external reference voltage), and then outputs this external reference voltage Vref. For example, the DAC 25 can provide a certain resolution such as 8 bits. This DAC 25 is coupled through a signal line to a switching input terminal γ of a switch 22. On the other hand, a switching input terminal β of the switch 22 is connected with an built-in reference voltage source 66 like the first embodiment. Thus, the switch 22 selects one of a reference voltage e1 from the built-in reference voltage source 66 and the external reference voltage Vref from the DAC 25, and supplies the chosen one to an error amplifier 61.

As well as the first embodiment the switch 22 performs its selective operation in accordance with an output signal of a comparator 23 (corresponding to the external input detecting unit). The positive-phase input terminal of the comparator 23 is coupled to a signal line for setting up the connection between the DAC 25 and the switching input terminal γ of the switch 22, while the negative-phase input terminal thereof proceeds to an comparing voltage source 30. Accordingly, the comparator 23 accepts the external reference voltage Vref and a comparing voltage e2. Further, the comparator 23 makes a comparison in magnitude between the external reference voltage Vref and the comparing voltage e2 and outputs the comparison result as a HIGH signal or a LOW signal. When the external reference voltage Vref is higher than the comparing voltage e2, assuming the application of the external reference voltage Vref the comparator 23 gives the HIGH signal to the switch 22. On the other hand, when the external reference voltage Vref is lower than the comparing voltage e2, it delivers the LOW signal to the switch 22.

The value of the comparing voltage e2 is set to be smaller than that of the external reference voltage Vref, and if the external reference voltage Vref is inputted in the comparator 23, the HIGH signal is given to the switch 22. When receiving the HIGH signal, the switch 22 selects the switching input terminal γ, and when receiving the LOW signal, it selects the switching input terminal β.

As well as the first embodiment the DC-DC converter 10 including the control section 21b thus arranged is mounted on electronic equipment, not shown, to supply an operating voltage to its load, not shown. Examples of using the DC-DC converter 10 mounted on the electronic equipment will be described hereinbelow about the case of commonly using the electronic equipment and the case of conducting the margin test.

(1) Common Use of Electronic Equipment

Let it be assumed that the operator applies an input voltage Vi onto the DC-DC converter 10 and supplies an ON signal to the control section 21b. In this case, the operator does not input the digital data of the external reference voltage value and the clock signal. Thus, the external reference voltage Vref is inputted into the comparator 23, and hence the comparator 23 gives the LOW signal to the switch 22. Whereupon, the switch 22 selects the switching input terminal β so that the internal reference voltage e1 of the built-in reference voltage source 66 is inputted into the error amplifier 61. In addition, a control voltage ERR is also inputted into the error amplifier 61. The operation after that is the same as that of the first embodiment, and the description thereof will be omitted for brevity. Finally, an output voltage Vo on the basis of the internal reference voltage e1 is constantly delivered to the output terminal of the DC-DC converter 10 so that the load normally operates.

(2) Implementation of Margin Test

In this case, the operator applies the input voltage Vi to the DC-DC converter 10 and provides the ON signal to the control section 21b. In addition, the operator supplies the control section 21b with the digital data of an external reference voltage with a certain value from and external and with a clock signal. At this time, the operator inputs the digital data of the external reference voltage value for the margin test in a bit serial form. This digital data is inputted into the shift register 24 of the control section 21b. The shift register 24 converts this digital data into bit parallel data and supplies the bit parallel data to the DAC 25. The DAC 25 converts the bit parallel data into an analog form to generate an external reference voltage Vref.

This external reference voltage Vref is inputted into the comparator 23, which also accepts the comparing voltage e2 from the comparing voltage source 30. The comparator 23 compares the external reference voltage Vref with the comparing voltage e2 of the comparing voltage source 30. Since the external reference voltage Vref is higher than the comparing voltage e2, the comparator 23 gives the HIGH signal to the switch 22. Responding to this signal, the switch 22 selects the switching input terminal γ so that the external reference voltage Vref is inputted into the error amplifier 61. In addition, the error amplifier 61 receives the control voltage ERR. The following operations are substantially the same as those in the first embodiment, and hence the description thereof will be omitted. An output voltage Vo on the basis of the external reference voltage Vref is constantly delivered to the output terminal of the DC-DC converter 10.

In response to stopping the input of the digital data to the control section 21b, the input of the external reference voltage Vref to the comparator 23 stops. Whereupon, the comparator 23 issues the LOW signal to the switch 22 which in turn, selects the switching input terminal β. That is, the selective operation is performed from the switching input terminal γ to the switching input terminal β. Further, the reference voltage is changed from the external reference voltage Vref to the internal reference voltage e1, with the result that the output voltage Vo on the basis of the internal reference voltage e1 appears at the output terminal of the DC-DC converter 10, thus enabling the electronic equipment to be put on the market.

The power control unit (control section 21b) according to the second embodiment substantially has the same effects as the first embodiment, while the external reference voltage Vref is producible by the digital data. For this reason, the external reference voltage Vref can be set through a software processing by a computer. For example, if the start-up control of the control section 21b is made by a monitoring program for monitoring a charging or discharging state of a battery power supply, it is possible to automatically perform the charging operation for the battery.

In the control section 21b according to the second embodiment, the digital data is designed to be inputted in a bit serial form in order to reduce the number of input and output terminal up to a minimum. Accordingly, in cases where there is no need to restrict the number of input and output terminals, the bit parallel input of the digital data is possible. In this case, it is possible to omit the shift register 24 of the control section 21b.

|Third Embodiment|

Figure 9:
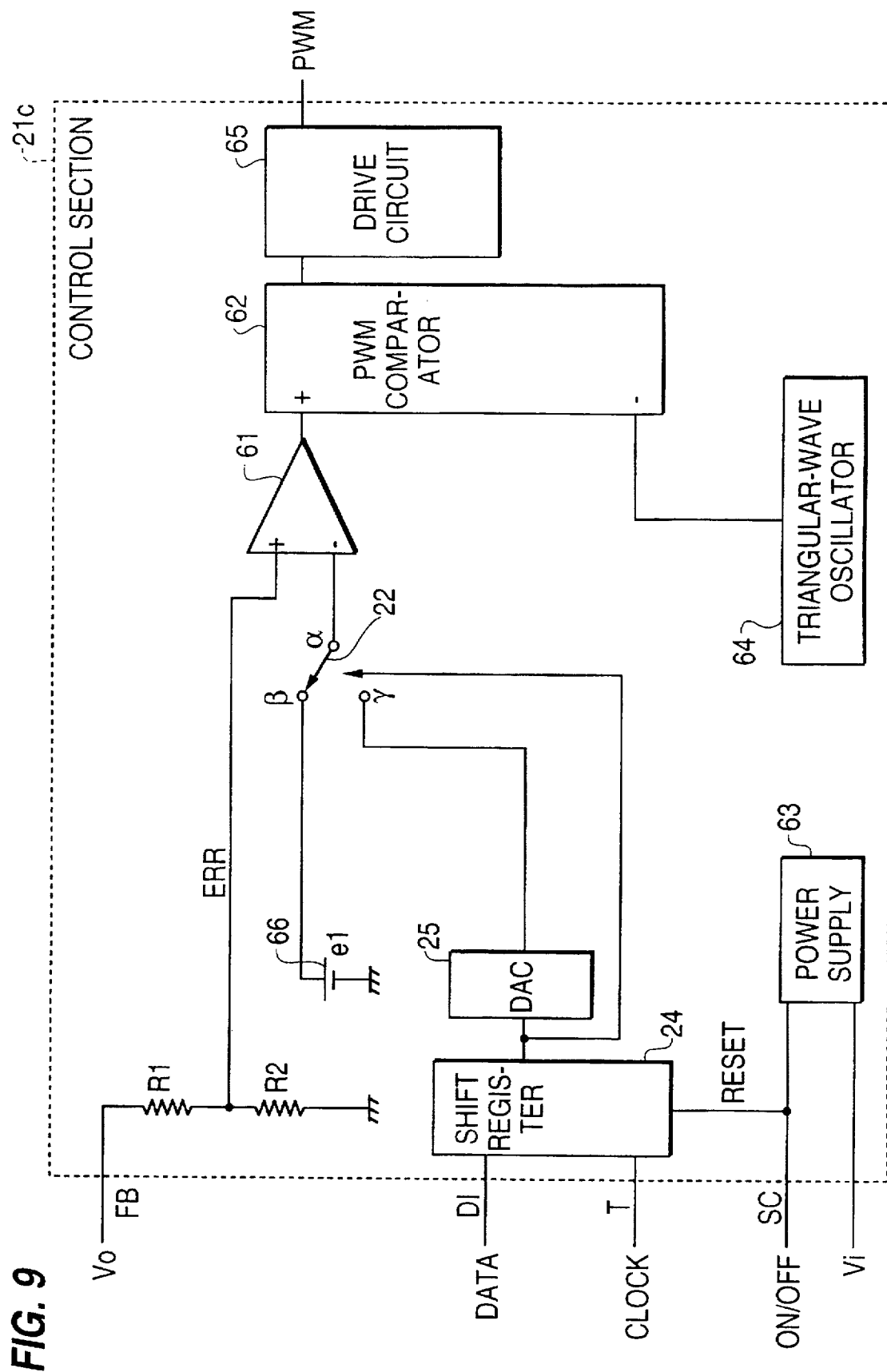
FIG. 9 is an illustration of an internal arrangement of a power control unit according to a third embodiment of this invention.

Furthermore, a description will be taken hereinbelow of a third embodiment of the present invention. FIG. 9 shows a power control unit (control section 21c) according to the third embodiment of this invention. This control section 21c is arranged such that bit parallel data is outputted from a shift register 24 and then inputted into a switch 22 on the condition that digital data of an external reference voltage value comprises a bit train indicative of an external reference voltage Vref and one bit for the selective operation of the switch 22 (selective operation data). The switch 22 detects the one bit for the selective operation in the bit parallel data. That is, the switch 22 has an added function equivalent to incorporating the external input detecting unit in this invention. Moreover, when not detecting the one bit for the selective operation or when the one bit for the selective operation is 0, the switch 22 selects the switching input terminal β, and when the selective operation one bit assumes 1, the switch 22 selects the switching input terminal γ. The other arrangement is the same as that of the second embodiment, and therefore the description will be omitted for simplicity.

In the control section 21c according to the third embodiment, the digital data of the external inputted is converted into bit parallel data in the shift register 24. This bit parallel data is inputted into both the DAC 25 and switch 22, and the DAC 25 converts it into an analog external reference voltage Vref. On the other hand, the switch 22 detects the selective operation one bit in the bit parallel data and selects the switching input terminal γ when deciding that the one bit shows 1. Thus, the external reference voltage Vref converted by the DAC 25 is inputted into the error amplifier 61. The following operations are the same as those in the second embodiment, and the description will be omitted for simplicity.

The third embodiment substantially has the same effects as the second embodiment, while the comparator 23 and the comparing voltage source 30 are omissible because the switch has the added function to detect the selective operation one bit. The digital data to be inputted into the switch 22 can be serial data inputted from the terminal DI. Further, it is also appropriate that, when the switch 22 detects the selective operation one bit, the switching input terminal γ is chosen irrespective of the selective operation one bit being 0 or 1. Moreover, it is also possible that the digital data of the external reference voltage does not include the selective operation one bit and, when the digital data of the external reference voltage is inputted into the switch 22, the switch 22 detects this digital data to select the switching input terminal γ.

In the above-described first to third embodiments the output voltage is changed from the original value in the + direction. However, in fact it is altered to the − direction, and hence a plurality of comparators 23 are provided or a logic circuit is provided so that it can be changed to the + and − directions.

|Fourth Embodiment|

Figure 10:
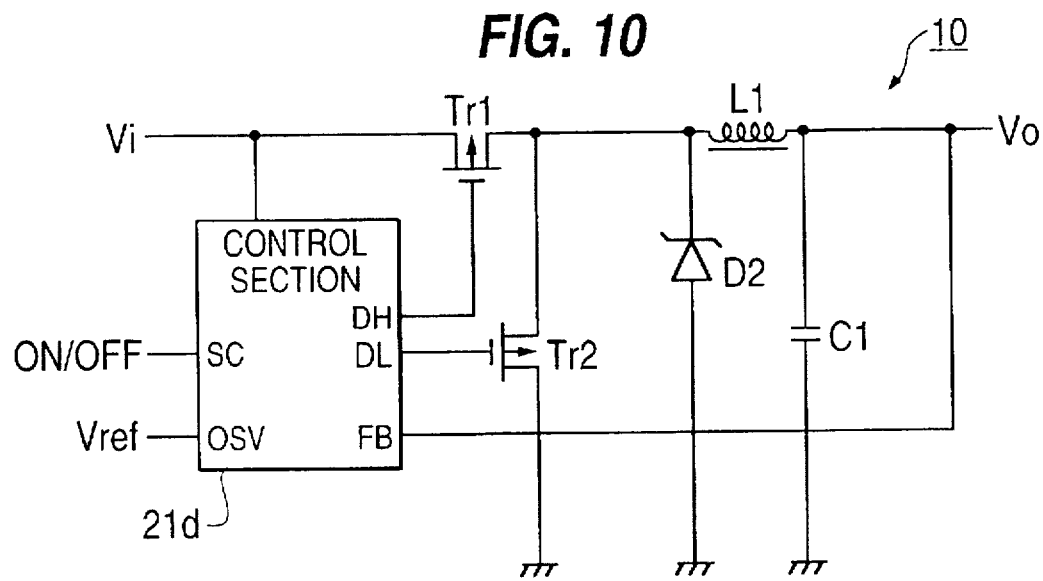
FIG. 10 is an illustration of an entire arrangement of a DC-DC converter using a power control unit according to a fourth embodiment of this invention.
Figure 12:
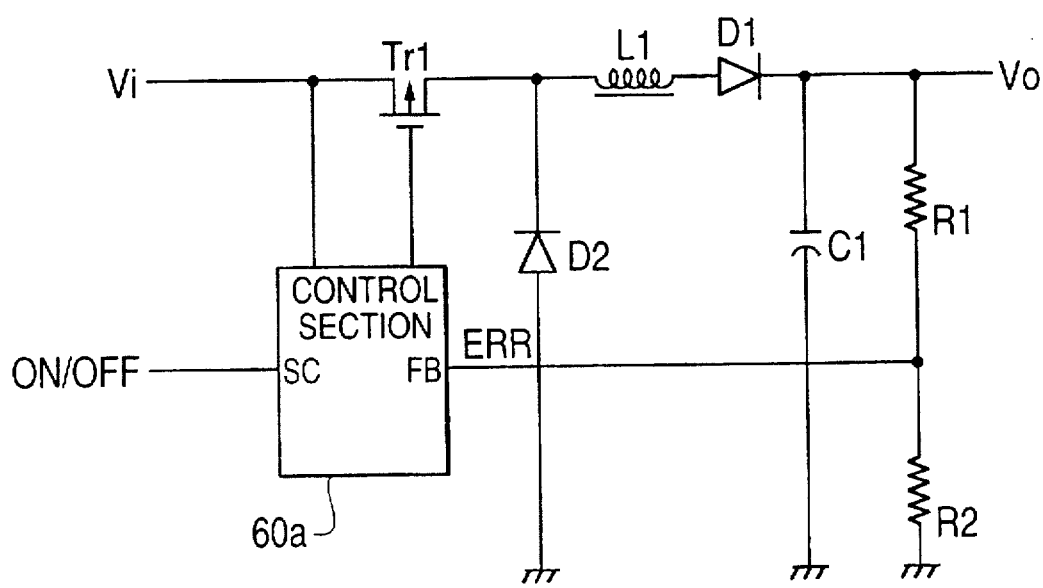
FIG. 12 is an illustration of an entire arrangement of a DC-DC converter using a prior power control unit.

Moreover, a description will be made hereinbelow of a fourth embodiment of the present invention. FIG. 10 shows a DC-DC converter 10 (corresponding to a power circuit) which is of a synchronous rectification type in which a power control unit according to the fourth embodiment is employed as a control section 21d. This DC-DC converter 10 substantially has the same arrangement as the DC-DC converter 10 (see FIG. 5) according to the first embodiment. For this reason, the description of the common points are omitted, while only the description of the different points will be made hereinbelow.

The control section 21d is provided with an output terminal DH and an output terminal DL. The output terminal DH is connected to a control terminal of a transistor Tr1 as well as in the first embodiment, whereas the output terminal DL is connected to a control terminal of a transistor Tr2. Further, an input terminal of the transistor Tr2 is coupled to between an output terminal of the transistor Tr1 and a choke coil L1, and an output terminal of the transistor Tr2 is grounded. The transistor Tr2 is a so-called synchronous rectification transistor, and is a flywheel switch circuit whereby the power accumulated in the choke coil L1 is discharged while the transistor Tr1 is in the OFF condition. This transistor Tr2 is ON-OFF-controlled by the control section 21d. That is, the transistor Tr2 turns ON when a voltage applied on a flywheel diode D2 takes the forward direction while turning OFF when the voltage exerted on the flywheel diode D2 takes the reverse direction. Thus, the voltage drop of the flywheel diode D2 can reduce. The transistor Tr2 is constructed with an FET. Incidentally, a diode D1 is removed from between the choke coil L1 and the output terminal of the DC-DC converter 10.

Secondly, referring to FIG. 11 a description will be made hereinbelow of an internal arrangement of the control section 21d. The control section 21d approximately has the same arrangement as the control section 21a (see FIG. 6) according to the first embodiment. For this reason, the description of the common points will be omitted, while only the different points will be made hereinbelow.

Figure 6:
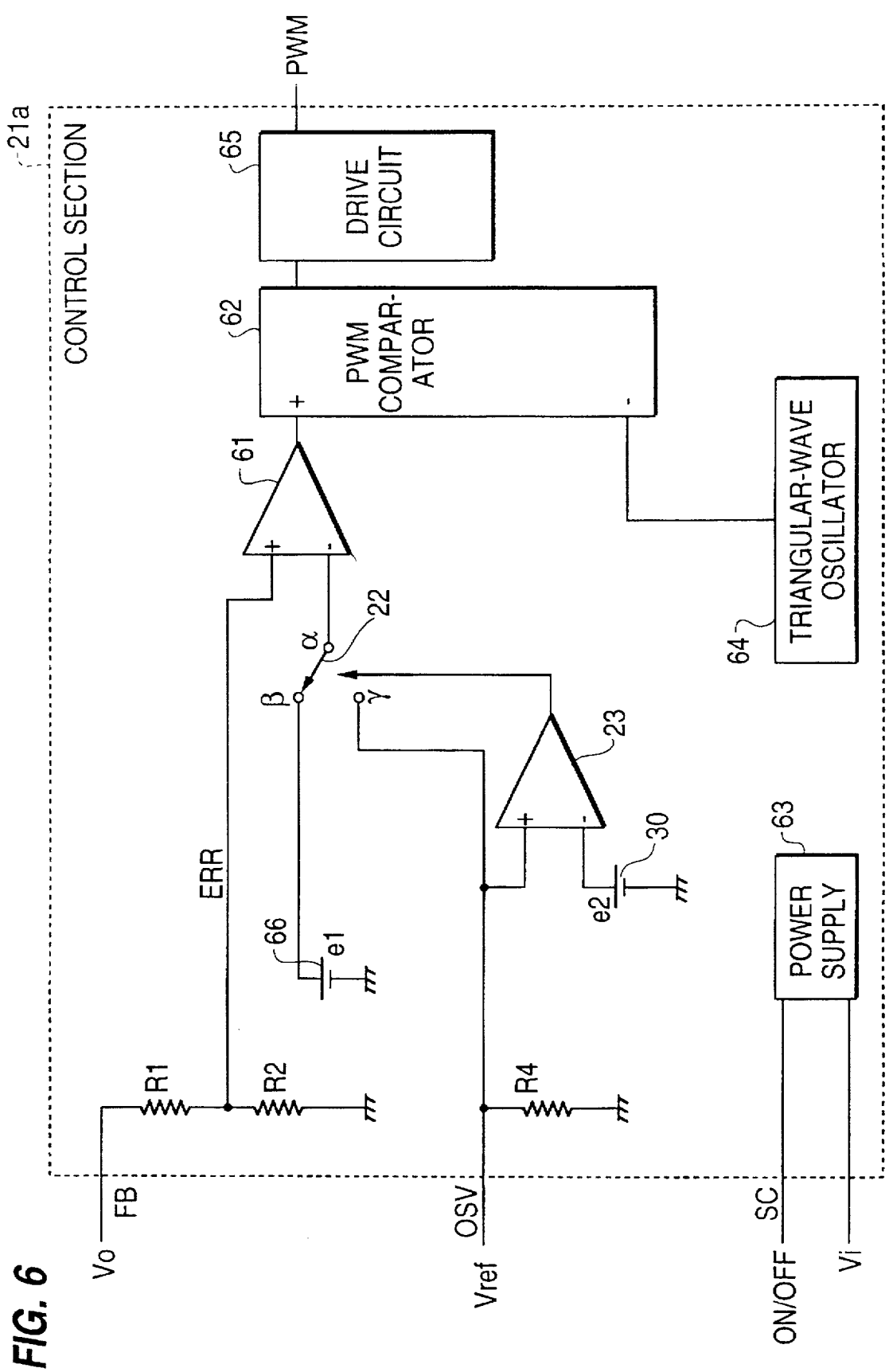
FIG. 6 is an illustration of an internal arrangement of the power control unit as shown in FIG. 5.

The control section 21d is arranged to exclude the comparator 23, the comparing voltage source 30 and the resistor R4 from the control section 21a as shown in FIG. 6. Instead, a charge pump circuit 67, a synchronous rectification control circuit 68 and a second drive circuit 69 are newly provided therein. An output terminal of a PWM comparator 62 (corresponding to the control signal generating unit) is connected to a drive circuit 65 and further to the synchronous rectification control circuit 68. Accordingly, the synchronous rectification control circuit 68 receives a PWM signal from the PWM comparator 62. This synchronous rectification control circuit 68 is for controlling the ON/OFF status of the transistor Tr2 for the synchronous rectification. That is, adjusting input timings, the synchronous rectification control circuit 68 supplies the second drive circuit 69 with a HIGH-level PWM signal when the PWM signal inputted from the PWM comparator 62 assumes a LOW level while supplying the second drive circuit 69 with a LOW-level PWM signal when the PWM signal takes a HIGH level, so that the transistor Tr2 turns ON/OFF simultaneously with the ON/OFF status of the transistor Tr1.

The charge pump circuit 67 is connected to the drive circuit 65 and further to the second drive circuit 69. This charge pump circuit 67 is a power circuit for supplying the drive circuit 65 and the second drive circuit 69 with the operating voltage for the transistor Tr1 and the transistor Tr2. The drive circuit 65 is coupled through the terminal DH to the control terminal of the transistor Tr1. When receiving the HIGH level PWM signal from the PWM comparator 62, this drive circuit 65 applies the voltage from the charge pump circuit 67 onto the control terminal of the transistor Tr1 to make the transistor Tr1 turn ON. The second drive circuit 69 is coupled to the output terminal of the synchronous rectification control circuit 68 and further is coupled through the terminal DL to the control terminal of the transistor Tr2. When receiving the HIGH level PWM signal from the synchronous rectification control circuit 68, this second drive circuit 69 supplies the voltage from the charge pump circuit 67 to the control terminal of the transistor Tr2. Whereupon, the transistor Tr2 turns ON for a given period of time in accordance with the PWM signal. The switch 22 performs the selective operation in accordance with the manual operation.

As well as the first embodiment, the DC-DC converter 10 equipped with such a control section 21d is mounted on electronic equipment (not shown) to supply the operating voltage to the load (not shown) of the electronic equipment Examples of using the DC-DC converter 10 mounted on the electronic equipment will be described hereinbelow about the case of commonly using the electronic equipment and the case of conducting the margin test.

(1) Common Use of Electronic Equipment

Figure 11:
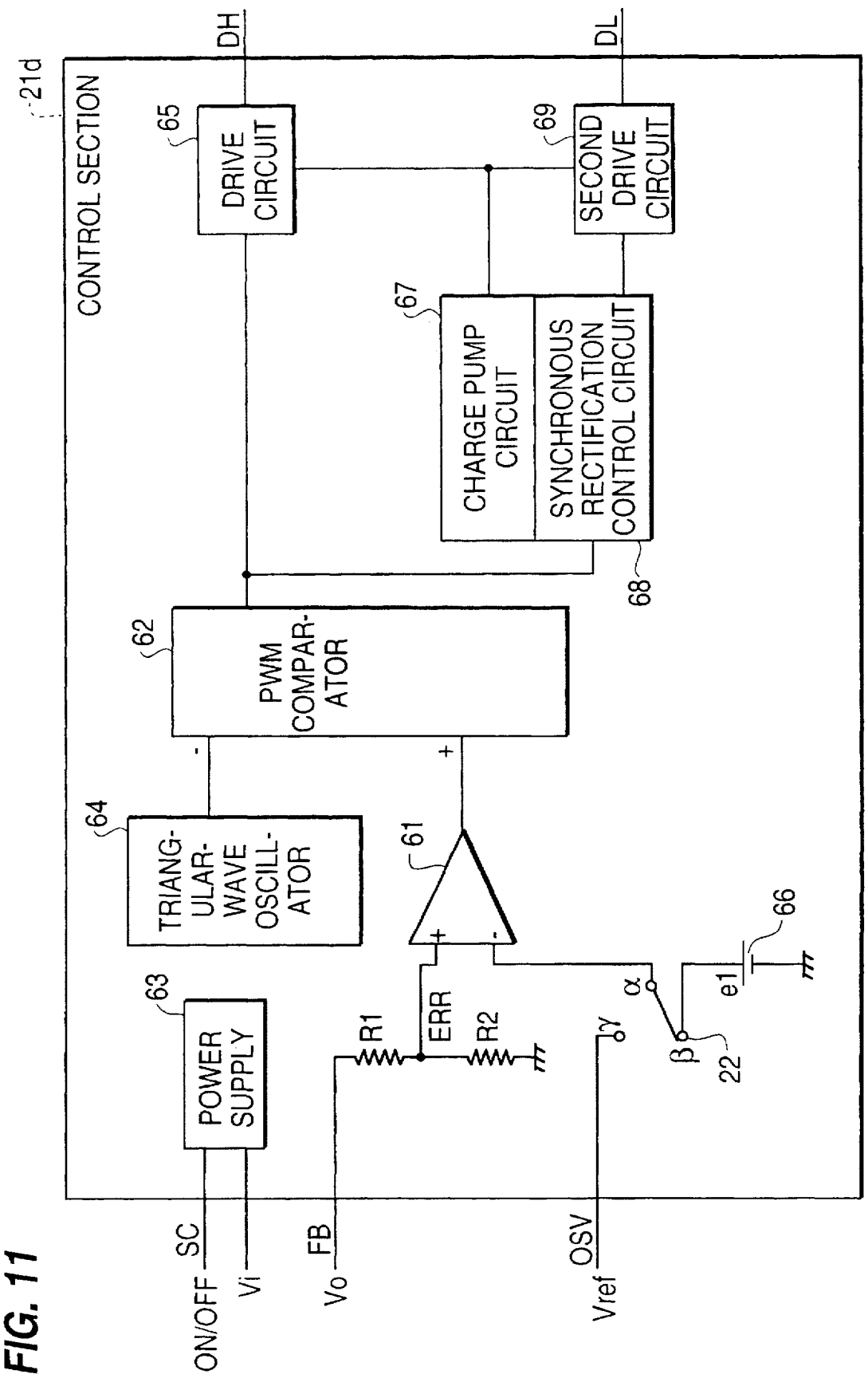
FIG. 11 is an illustration of an internal arrangement of the power control unit as shown in FIG. 10.
Figure 13:
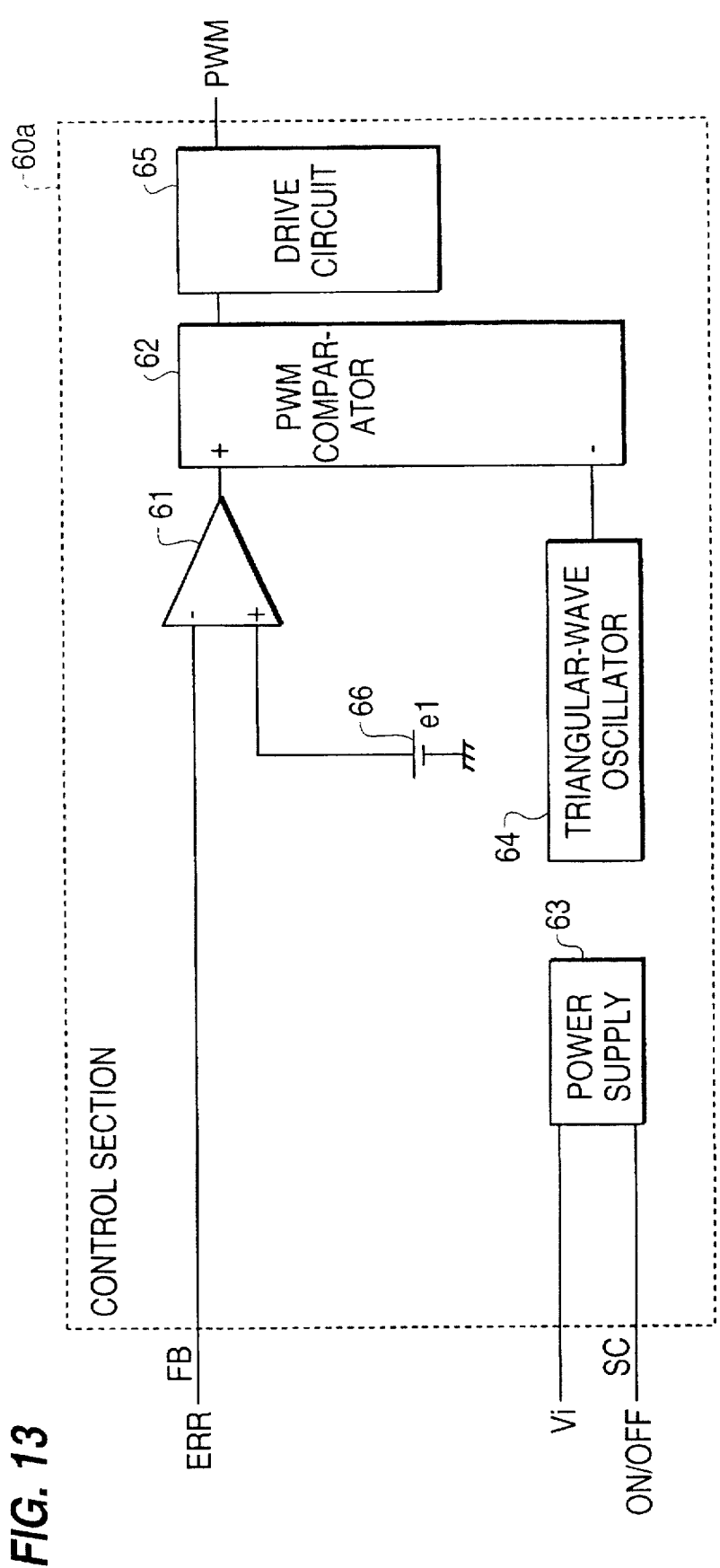
FIG. 13 is an illustration of an internal arrangement of the power control unit as shown in FIG. 12.
Figure 14:
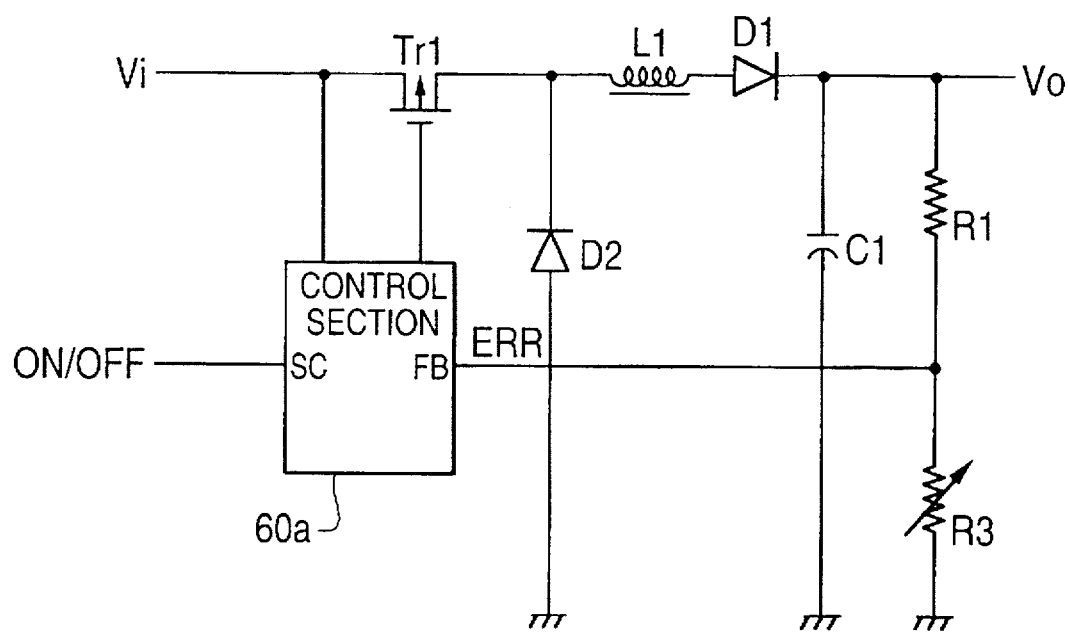
FIG. 14 is an illustration of an entire arrangement of the FIG. 12 DC-DC converter in a margin test.
Figure 15:
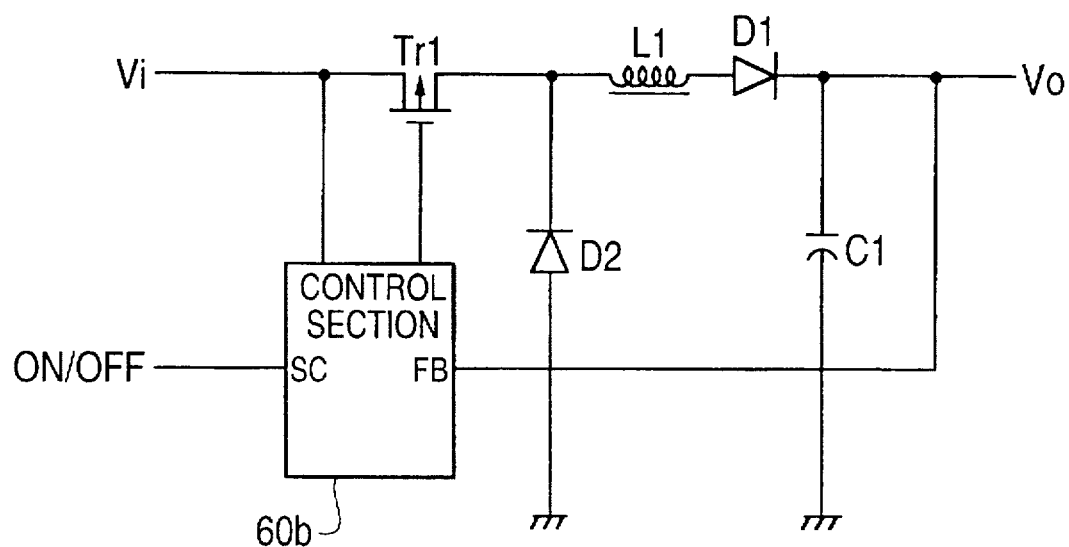
FIG. 15 is an illustration of an entire arrangement of a DC-DC converter using a prior power control unit.
Figure 16:
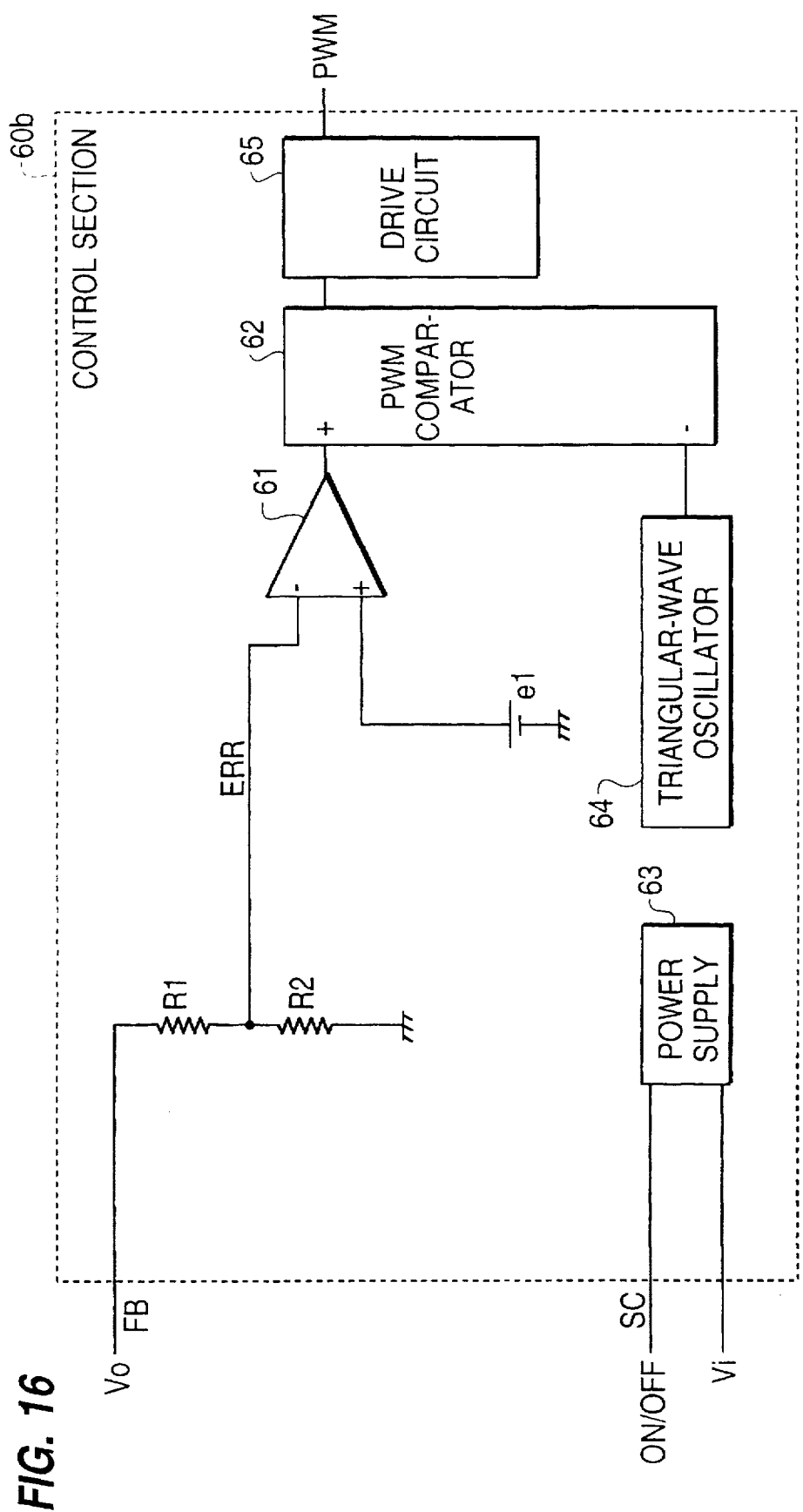
FIG. 16 is an illustration of an internal arrangement of the power control unit as shown in FIG. 15.

Let it be assumed that the operator moves a switch 22 of FIG. 11 to the switching input terminal β side and applies an input voltage Vi onto the input terminal of the DC-DC converter 10 of FIG. 10, and further gives an ON signal to the control section 21a. With these operator's operations, a power supply 63 of the control section 21d accepts power and the ON signal. This power supply 63 supplies the power to each part of the control section 21d in accordance with the ON signal, and a triangular-wave oscillator 64 generates a triangular-wave signal. In addition, the charge pump circuit 67 supplies a voltage to the drive circuit 65 and further to the second drive circuit 69. Further, a comparing voltage source 30 delivers a comparing voltage e2 to a comparator 23.

Since as mentioned before the switch 22 is in the switching input terminal β selecting state, an internal reference voltage e1 is inputted from a built-in reference voltage source 66 to an error amplifier 61. Since at this time there is no detection of an output voltage Vo, the zero voltage is inputted as an control voltage ERR into the error amplifier 61. The error amplifier 61 compares the internal reference voltage e1 with the control voltage ERR to detect and amplify the difference therebetween and supply the resultant as an output signal to the PWM comparator 62 Further, the PWM comparator 62 accepts a triangular-wave signal from the triangular-wave oscillator 64. The PWM comparator 62 compares an output signal of the error amplifier 61 with the triangular-wave signal. Since the value of the control voltage ERR is zero and hence the triangular-wave signal is higher than the output signal of the error amplifier 61, the HIGH level PWM signal is inputted into both the drive circuit 65 and synchronous rectification circuit 68.

In response to the reception of the HIGH level PWM signal, the drive circuit 65 uses the voltage from the charge pump circuit 67 to make the transistor Tr1 of FIG. 10 turn ON . On the other hand, when receiving the HIGH level PWM signal, the synchronous rectification control circuit 68 generates a LOW signal and supplies it to the second drive circuit 69 taking into consideration the time that the transistor Tr1 turns ON. When receiving the LOW level signal, the second drive circuit 69 utilizes the voltage from the charge pump circuit 67 to make the transistor Tr2 of FIG. 10 turn OFF in accordance with the PWM signal. As a result, simultaneously with the turning-ON of the transistor Tr1, the transistor Tr2 turns OFF, while the transistor Tr2 turns ON simultaneously with the turning-OFF of the transistor Tr1.

While the transistor Tr1 is in the ON condition, the voltage is exerted on the output terminal side of the transistor Tr1 so that a choke L1 accumulates power. When the transistor Tr1 comes into the OFF condition, at the same time the transistor Tr2 gets into the ON status. Thus, a flywheel diode D2 releases the power accumulated in the choke L1, with the result that the output voltage Vo on the basis of the internal reference voltage e1 appears at the output terminal of the DC-DC converter 10. This output voltage Vo is inputted through the terminal FB to the control section 21d at any time, and resistors R1 and R2 of FIG. 11 detect it as the control voltage ERR. This control voltage ERR is inputted to the error amplifier 61 which in turn, supplies the PWM comparator 62 with the detection and amplification result of the difference between the control voltage ERR and the internal reference voltage e1.

The PWM comparator 62 compares the output signal of the error amplifier 61 with the triangular-wave signal to generate the HIGH level or LOW level PWM signal to offer it to both the drive circuit 65 and synchronous rectification control circuit 68. On the basis of the PWM signal, the drive circuit 65 and the second drive circuit 69 ON/OFF-control the transistor Tr1 and the transistor Tr2. These operations are performed repeatedly.

Thus, the control section 21d monitors the output voltage Vo, and when the value of the output voltage vo decreases, it ON/OFF-controls the transistor Tr1 and the transistor Tr2 so that the output voltage Vo on the basis of the internal reference voltage e1. Whereupon, the output voltage Vo on the basis of to the internal reference voltage e1 develops at the output terminal of the DC-DC converter 10 and given as the operating voltage to the load so that the load normally operates.

(2) Implementation of Margin Test

For the margin test, let it be assumed that the operator moves the switch 22 of FIG. 11 to the switching input terminal γ and applies the input voltage Vi to the input terminal of the DC-DC converter 10 of FIG. 10, and supplies the ON signal to the control section 21d. In addition, the external reference voltage Vref for the margin test is applied through the terminal OSV thereon. Thus, the power supply 63 supplies the power to each part of the control section 21d, and the triangular-wave oscillator 64 supplies the triangular-wave signal to the PWM comparator 62. In addition, the charge pump circuit 67 applies the voltage to the drive circuit 65 and the second drive circuit 69.

Since the switch 22 is in the switching input terminal γ selecting state, the external reference voltage Vref is inputted to the error amplifier 61. On the other hand, since at this time there is no detection of the output voltage Vo, the zero voltage is inputted as the control voltage ERR to the error amplifier 61. The following operations are the same as in the case of commonly using the electronic equipment, and hence the description thereof will be omitted. Finally, the output voltage Vo on the basis of the external reference voltage Vref is constantly outputted to the output terminal of the DC-DC converter 10. When the operator moves the switch 22 to the switching input terminal β side after the completion of the margin test, the electronic equipment comes to be put on the market.

The fourth embodiment substantially has the same effects as the first embodiment. However, since the selective operation of the switch 22 in this embodiment is made by the manual operation, as compared with the other embodiments the number of processing steps increases in the margin test.

In the first and fourth embodiments the input voltage Vi can directly be used as the driving voltage for the control section, or the input voltage measured can be used. Although the DC-DC converter is illustrated as the power circuit, the power circuit to which the power control unit according to this invention is applicable is not limited thereto, but can cover a series regulator and others.

What is claimed is:

1. A power control unit controlling an output voltage of a power circuit, comprising:
   output voltage detecting unit for detecting the output voltage of said power circuit as a control voltage;
   a built-in reference voltage source for supplying an internal reference voltage;
   a selector, coupled to the built-in reference voltage source, selecting one of said internal reference voltage supplied from said built-in reference voltage source and an external reference voltage applied externally to said power control unit as a selected reference voltage to be compared with said control voltage detected by said output voltage detecting unit; and
   control signal generating unit for generating a control signal for adjusting the output voltage of said power circuit to a voltage corresponding to the selected reference voltage on the basis of the comparison result of said selected reference voltage selected by said selector and said control voltage detected by said output voltage detecting means.

2. A power control unit according to claim 1, further comprising external input detecting unit for detecting whether said external reference voltage is applied thereto, wherein said selector selects one of said internal reference voltage and said external reference voltage on the basis of the detection result by said external input detecting means.

3. A power control unit controlling an output voltage of a power circuit, comprising:
   output voltage detecting unit for detecting an output voltage of said power circuit as a control voltage;
   a built-in reference voltage source supplying an internal reference voltage;
   a digital-to-analog converter converting a digital data of an external reference voltage input from externally into an analog external reference voltage;
   a selector, coupled to the built-in reference voltage source and to the digital-to-analog converter, selecting one of said internal reference voltage supplied from said built-in reference voltage source and said external reference voltage converted by said digital-to-analog converter as a selected reference voltage to be compared with said control voltage detected by said output voltage detecting means; and
   control signal generating unit for generating a control signal for adjusting the output voltage of said power circuit to voltage corresponding to the selected reference voltage on the basis of the comparison result of said selected reference voltage selected by said selector and said control voltage detected by said output voltage detecting means.

4. A power control unit according to claim 3, further comprising external input detecting means for detecting whether said external reference voltage is applied thereto, wherein said selector selecting one of said internal reference voltage and said external reference voltage on the basis of the detection result by said external input detecting means.

5. A power control unit according to claim 4, wherein said external input detecting unit detects said analog external reference voltage converted by said digital-to-analog converter, and said selector selects one of said internal reference voltage and said external reference voltage on the basis of the detection result by said external input detecting means.

6. A power control unit according to claim 4, wherein said external input detecting unit detects said digital data of said external reference voltage inputted into said digital-to-analog converter, and said selector selects one of said internal reference voltage and said external reference voltage on the basis of the detection result by said external input detecting means.

7. A power control unit according to claim 3, wherein said digital data of said external reference voltage comprises data for a selective operation of said selector, and said selector detects said selector selective operation data and selects, on the basis of the detected selector selective operation data, one of said internal reference voltage from said built-in reference voltage source and said external reference voltage converter by said digital-to-analog converter.

8. A loading test method for testing operations of loading connected to a power circuit by making use of a power control unit provided with output voltage detecting unit for detecting an output voltage of the power circuit as a control voltage, a built-in reference voltage supplying an internal reference voltage, a selector for selecting one of the internal reference voltage supplied from the built in reference voltage source and an external reference voltage applied from externally as a selected reference voltage to be compared with the control voltage detected by said output voltage detecting means, and control signal generating unit for generating a control signal for adjusting the output voltage of the power circuit to voltage corresponding to the selected reference voltage on the basis of the comparison result of the control voltage detected by said output voltage detecting unit and the selected reference voltage selected by the selector, comprising the steps of:
   applying the external reference voltage to the power control unit from externally, when the operations of the loading are tested;
   supplying the loading with the output voltage of the power circuit which has been adjusted to voltage corresponding to the external reference voltage by making the selector select the external reference voltage as the selected reference voltage; and
   checking an operation range of the loading by chancing a value of the external reference voltage.

9. A loading test method according to claim 8, wherein the power control unit comprises external input detecting unit for detecting whether the external reference voltage is applied thereto, so that the selector selects the external reference voltage as the selected reference voltage on the basis of the detection result by said external input detecting means.

10. A loading test method according to claim 8, wherein the value of the output voltage of the power circuit supplied to the loading is changed by changing the value of the external reference voltage applied to the power control unit.

11. A loading test method for testing operations of loading connected to a power circuit by making use of a power control unit provided with output voltage detecting unit for detecting an output voltage of the power circuit as a control voltage, a digital-to-analog converter for converting a digital data of an external reference voltage input from externally into an analog external reference voltage, a selector for selecting one of the internal reference voltage supplied from the built-in reference voltage source and the external reference voltage converted by the digital-to analog converter as a selected reference voltage to be compared with the control voltage detected by said output voltage detecting means, and control signal generating means for generating a control signal for adjusting the output voltage of the power circuit to voltage corresponding to the selected reference voltage on the basis of the comparison result of the control voltage detected by the output voltage detecting means and the selected reference voltage selected by the selector, comprising the steps of:

inputting the digital data of the external reference voltage into the power control unit from externally, when the operations of the loading are tested;

supplying the loading with the output voltage of the power circuit which has been adjusted to the voltage corresponding to the external reference voltage by making the selector select the external reference voltage as the selected reference voltage; and checking an operation range of the loading by changing a value of the digital data of the external reference voltage.

12. A loading test method according to claim 11, wherein the power control unit comprises external input detecting means for detecting whether or not the external reference voltage is applied thereto, so that the selector selects the external reference voltage as the selected reference voltage on the basis of the detection result by said external input detecting means.

13. A loading test method according to claim 12, wherein said external input detecting means detects the analog external reference voltage converted by the digital-to-analog convertor, so that the selector selects the external reference voltage as the selected reference voltage on the basis of the detection result by said external input detecting means.

14. A loading test method according to claim 12, wherein said external input detecting means detects the digital data inputted into the digital-to-analog convertor so that the selector selects the external reference voltage as the selected reference voltage on the basis of the detection result by said external input detecting means.

15. A loading test method according to claim 11, wherein the digital data of the external reference voltage comprises data for a selective operation of the selector, so that the selector selects the data for a selective operation of the selector and selects the external reference voltage converted by the digital-to-analog convertor as the selected reference voltage, on the basis of the data for a selective operation of the selector.

16. A loading test method according to claim 11, wherein the value of the output voltage of the pow er circuit supplied to the loading by changing the digital data of the external reference voltage.

17. A power control unit comprising a single integrated circuit, said single integrated circuit comprising:

output voltage detecting means for detecting an output voltage of the power circuit as a control voltage;

a built-in reference voltage source supplying an internal reference voltage;

a selector, coupled to the built-in reference voltage source, selecting one of the internal reference voltage supplied from the built-in reference voltage source and an external reference voltage applied from externally as a selected reference voltage to be compared with the control voltage detected by said output voltage detecting means; and control signal generating means for generating a control signal for adjusting the output voltage of the power circuit to voltage corresponding to the selected reference voltage on the basis of the comparison result of the control voltage detected by said output voltage detecting means and the selected reference voltage selected by the selector.

18. A power control unit according to claim 17, said single integrated circuit further comprising:

external input detecting means for detecting whether or not the external reference voltage is applied thereto, wherein the selector selects one of the internal reference voltage and the external reference voltage on the basis of the detection result by said external input detecting means.

19. A power control unit, comprising a single integrated circuit, said single integrated circuit comprising:

output voltage detecting unit for detecting an output voltage of the power circuit as a control voltage;

a built-in reference voltage source supplying an internal reference voltage;

a digital-to-analog convertor for converting a digital data of an external reference voltage input from externally into an analog external reference voltage;

a selector selecting one of the internal reference voltage supplied from the built-in reference voltage source and the external reference voltage converted by the digital-to-analog convertor as a selected reference voltage to be compared with the control voltage detected by said output voltage detecting means; and control signal generating unit for generating a control signal for adjusting the output voltage of the power circuit to voltage corresponding to the selected reference voltage on the basis of the comparison result of the control voltage detected by said output voltage detecting means and the selected reference voltage selected by the selector.

20. A power control unit according to claim 19, further comprising:

external input detecting means for detecting whether the external reference voltage is applied thereto, wherein the selector selects one of the internal reference voltage and the external reference voltage on the basis of the detection result by said external input detecting means.

21. A power control unit according to claim 20, wherein said external input detecting means detects the analog external reference voltage converted by the digital-to-analog convertor, and the selector selects one of the internal reference voltage and the external reference voltage on the basis of the detection result by said external input detecting means.

22. A power control unit according to claim 20, wherein said external input detecting means detects the digital data of the external reference voltage inputted into the digital-to-analog convertor, and the selector selects one of the internal reference voltage and the external reference voltage on the basis of the detection result by said external input detecting means.

23. A power control unit according to claim 19, wherein the digital data of the external reference voltage comprises the data for selective operation of the selector, and the selector detects the data for selective operation of the selector and selects one of the internal reference voltage supplied from the built-in reference voltage source and the external reference voltage converted by the digital-to-analog convertor on the basis of the data for selective operation of the selector.

\* \* \* \* \*